(12) United States Patent
Huang et al.

(10) Patent No.: US 11,711,597 B2
(45) Date of Patent: Jul. 25, 2023

(54) POLYGONAL OPTICAL MECHANISM AND OPTICAL SYSTEM

(71) Applicant: TDK TAIWAN CORP., Taoyuan (TW)

(72) Inventors: Chen-Hsin Huang, Taoyuan (TW); Yi-Ho Chen, Taoyuan (TW); Ya-Hsiu Wu, Taoyuan (TW); Shou-Jen Liu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/508,455

(22) Filed: Oct. 22, 2021

(65) Prior Publication Data
US 2022/0132003 A1    Apr. 28, 2022

Related U.S. Application Data

(60) Provisional application No. 63/121,415, filed on Dec. 4, 2020, provisional application No. 63/104,118, filed on Oct. 22, 2020.

(51) Int. Cl.
| | |
|---|---|
| H04N 5/225 | (2006.01) |
| H04N 23/51 | (2023.01) |
| G02B 7/02 | (2021.01) |
| G02B 7/08 | (2021.01) |
| G03B 5/00 | (2021.01) |
| G02B 7/09 | (2021.01) |

(52) U.S. Cl.
CPC ............ *H04N 23/51* (2023.01); *G02B 7/025* (2013.01); *G02B 7/08* (2013.01); *G02B 7/09* (2013.01); *G03B 5/00* (2013.01); *G03B 2205/0069* (2013.01)

(58) Field of Classification Search
CPC .. H04N 5/2252; H04N 5/2253; H04N 5/2254; G02B 7/025; G02B 7/08; G02B 7/09; G02B 27/646; G03B 5/00; G03B 2205/0069; G03B 2205/0076; G03B 3/10; G03B 30/00; F03G 7/06143; F03G 7/0665; H02K 41/02
See application file for complete search history.

(56) References Cited

U.S. PATENT DOCUMENTS

| | | | |
|---|---|---|---|
| 2014/0139729 A1* | 5/2014 | Chen .................. | G03B 3/00 74/110 |
| 2017/0153413 A1* | 6/2017 | Lin ..................... | G02B 7/08 |

(Continued)

FOREIGN PATENT DOCUMENTS

CN        213365151 U    6/2021

OTHER PUBLICATIONS

Office Action of corresponding CN Application No. 202122557503. 7, dated Feb. 9, 2022, 2 pages.

*Primary Examiner* — Padma Haliyur
(74) *Attorney, Agent, or Firm* — Muncy, Geissler, Olds & Lowe, P.C.

(57) ABSTRACT

An optical mechanism is provided. The optical mechanism includes an immovable part, a movable part, a drive assembly, and a guidance assembly. The movable part is connected to an optical element. The movable part is movable relative to the immovable part. The drive assembly drives the movable part to move relative to the immovable part. The guidance assembly guides the movable part to move along a first axis.

19 Claims, 24 Drawing Sheets

(56) References Cited

U.S. PATENT DOCUMENTS

| | | | |
|---|---|---|---|
| 2018/0175758 A1* | 6/2018 | Chan | H02K 11/225 |
| 2018/0224628 A1* | 8/2018 | Hu | G01D 5/20 |
| 2018/0252893 A1* | 9/2018 | Park | H02K 41/0356 |

* cited by examiner

POLYGONAL OPTICAL MECHANISM AND OPTICAL SYSTEM

CROSS REFERENCE TO RELATED APPLICATIONS

This application claims the benefit of U.S. Provisional Application No. 63/104,118, filed on Oct. 22, 2020, and U.S. Provisional Application No. 63/121,415, filed on Dec. 4, 2020, the entirety of which is incorporated by reference herein.

BACKGROUND OF THE INVENTION

Field of the Invention

The present invention relates to a drive mechanism, and in particular, to an optical mechanism.

Description of the Related Art

As technology has developed, many electronic devices (such as tablet computers and smartphones) may be used for capturing images and recording video. The optical element and the optical mechanism in the electronic device allow the user to use the electronic device to capture images and record video. When the electronic device is being used, shock or vibration may occur, and this may cause the images or video to come out blurry. Therefore, demand for higher quality images and video is increasing.

BRIEF SUMMARY OF THE INVENTION

An optical mechanism is provided. The optical mechanism includes an immovable part, a movable part, a drive assembly, and a guidance assembly. The movable part is connected to an optical element. The movable part is movable relative to the immovable part. The drive assembly drives the movable part to move relative to the immovable part. The guidance assembly guides the movable part to move along a first axis.

In some embodiments, the guidance assembly includes a first guidance element extending in the first axis and a second guidance element extending in the first axis. The optical mechanism further includes a sensing assembly sensing movement of the movable part relative to the immovable part, and the sensing assembly includes a reference element and a sensing element corresponding to the reference element. The minimum distance between the sensing assembly and the first guidance element is less than the minimum distance between the sensing assembly and the second guidance element. In some embodiments, when viewed from the first axis, the optical mechanism is polygonal, and the optical mechanism includes a first side, a second side, a third side, and a fourth side. When viewed from the first axis, the first side is parallel with a third axis and extends in the third axis. When viewed from the first axis, the second side is parallel with a second axis and extends in the second axis, and the first axis, the second axis, and the third axis are perpendicular to each other. The third side is opposite to the first side. The fourth side is opposite to the second side. When viewed from the first axis, the drive assembly is located on the first side, the guidance assembly is located on the first side, and the sensing assembly is located on the second side.

In some embodiments, the drive assembly includes a first drive element and a second drive element, the first drive element and the second drive element includes a shape memory alloy material. The optical mechanism further includes a control assembly controlling the drive assembly, and the control assembly includes a first control unit outputting a first drive signal to the first drive element of the drive assembly. The first control unit and the sensing element are packaged in a first package. In some embodiments, the control assembly further includes a second control unit outputting a second drive signal to the second drive element of the drive assembly. The second control unit is packaged in a second package. The first package and the second package are independent, and a gap is formed between the first package and the second package.

In some embodiments, the optical mechanism further includes a first circuit assembly and a second circuit assembly. The first circuit assembly includes a plurality of first circuits. The first circuits are located on a first imaginary plane that is parallel with the first axis. The second circuit assembly includes a plurality of second circuits. The second circuits are located on a second imaginary plane that is not parallel with the first imaginary plane. In some embodiments, the first package and the second package are disposed on the first circuit assembly. In some embodiments, the immovable part includes a frame and a bottom immovably connected to the frame, the second circuit assembly is immovably disposed on the bottom, and at least part of the second circuits are embedded and not revealed from the bottom.

In some embodiments, the optical mechanism further includes an external connection terminal electrically connected to an external circuit. The external connection terminal and at least part of the second circuits are integrally formed as a complete piece. In some embodiments, the first circuit assembly is located on the second side, and the external connection terminal is located on the fourth side. In some embodiments, the first package is electrically connected to the external circuit via the first circuit assembly and the second circuit assembly sequentially, and the drive assembly is electrically connected to the first package via the second circuit assembly and the first circuit assembly sequentially.

In some embodiments, the optical mechanism further includes a strengthening element strengthening mechanical strength of the frame. The strengthening element includes a metal material, and at least part of the strengthening element is embedded in the frame and not revealed from the frame. In some embodiments, the guidance assembly includes a magnetically-permeable element, the magnetically-permeable element includes a magnetically-permeable material, and a gap is formed between the strengthening element and the magnetically-permeable element.

In some embodiments, the frame includes a first frame surface and a second frame surface, and the bottom includes a first bottom surface, a third bottom surface and a fourth bottom surface. The first frame surface, the second frame surface, the first bottom surface, the third bottom surface, and the fourth bottom surface are perpendicular to the first axis. The first frame surface faces the third bottom surface, and the first frame surface is parallel with the third bottom surface. The second frame surface faces the fourth bottom surface, and the second frame surface is parallel with the fourth bottom surface. The first bottom surface faces the frame. When viewed from the first axis, the minimum distance between the first frame surface and the movable part is less than the minimum distance between the second frame surface and the movable part. The minimum distance between the first bottom surface and the third bottom surface in the first axis is greater than a minimum distance between the first bottom surface and the third bottom surface in the first axis. In some embodiments, the minimum distance between the first frame surface and the third bottom surface is less than the minimum distance between the second frame surface and the fourth bottom surface.

In some embodiments, the frame includes a third frame surface, the bottom includes a fifth bottom surface, and the third adhesive element is disposed between the third frame surface and the fifth bottom surface, so that the frame is immovably connected to the bottom via the third adhesive element. In some embodiments, the third frame surface faces the fifth bottom surface, the third frame surface is not parallel with the fifth bottom surface, and one of the third frame surface and the fifth bottom surface is parallel with the first axis.

An optical system including an optical mechanism is provided. When viewed from a direction of an incident light, the movable part is completely revealed from the immovable part. The optical system includes a case, a base, and a drive module. The case has a top wall and a side wall. The top wall is not parallel with the side wall, and the top wall restricts movement range of the movable part. An accommodating space accommodating the optical mechanism is formed by the case and the base. The drive module drives the optical mechanism to move relative to the case.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following disclosure provides many different embodiments, or examples, for implementing different features of the subject matter provided. Specific examples of components and arrangements are described below to simplify this disclosure. These are, of course, merely examples and are not intended to be limiting. For example, the formation of a first feature "on" and/or "above" a second feature in the description that follows may include embodiments in which the first and second features are formed in direct contact, and may also include embodiments in which additional features may be formed between the first and second features, so that the first and second features may not be in direct contact. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly. In addition, in different examples of this disclosure, symbols or alphabets may be used repeatedly.

Ordinal terms such as "first", "second", etc., used in the description and in claims do not by themselves connote any priority, precedence, or order of one element over another, but are used merely as labels to distinguish one element from another element having the same name. Unless the context requires otherwise, throughout the specification and claims that follow, the word "include", "have" and variations thereof, such as "includes", "including", "having" are to be construed in an open, inclusive sense, that is, as "including, but not limited to."

Figure 1:
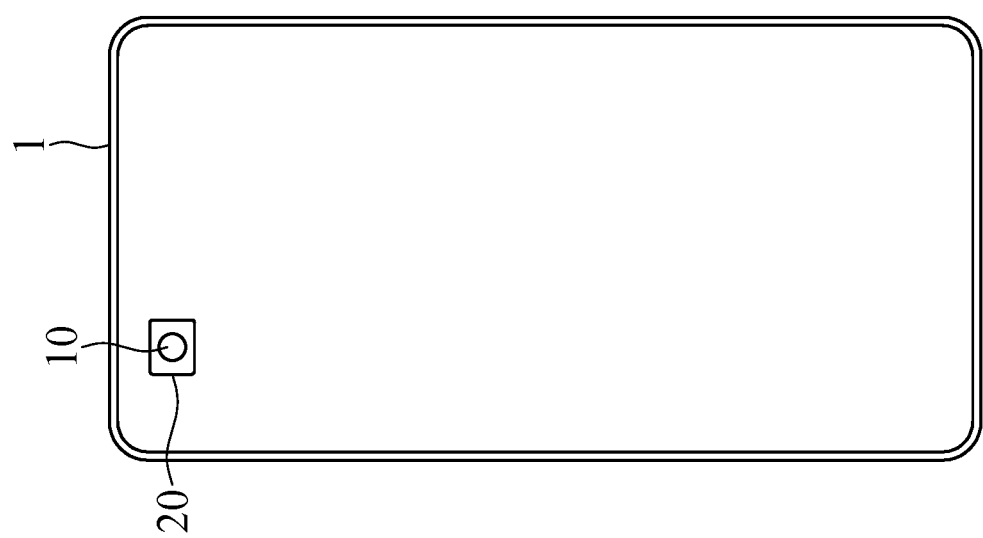
FIG. 1 is a schematic view of the electronic device, the optical element, and the optical mechanism.
Figure 2:
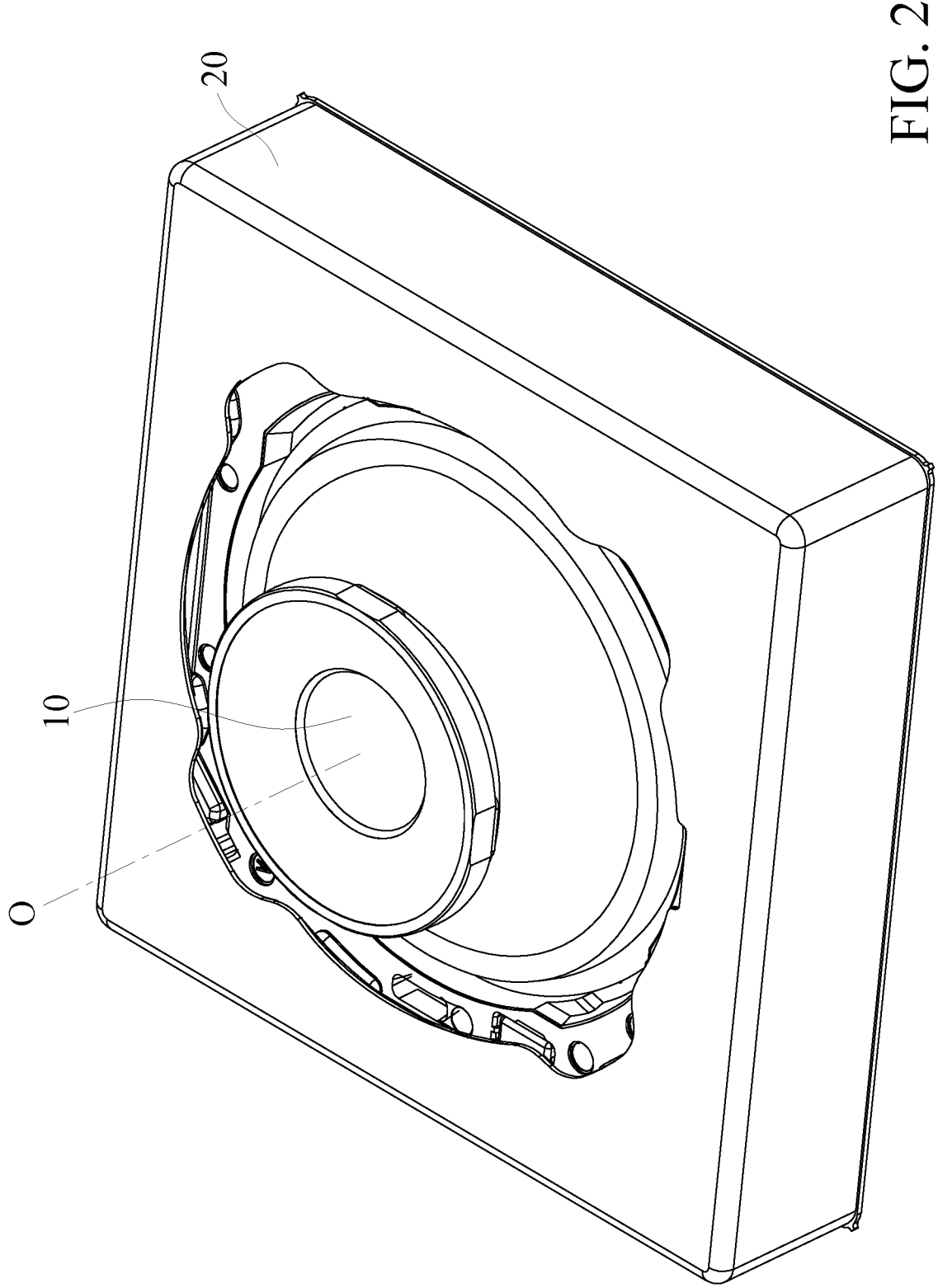
FIG. 2 is a schematic view of the optical element and the optical mechanism.

Please refer to FIG. 1 and FIG. 2. FIG. 1 is a schematic view of an electronic device 1, an optical element 10, and an optical system 20. FIG. 2 is a schematic view of the optical element 10 and the optical system 20. The electronic device 1 may be a tablet computer, a smartphone, etc. The optical element 10 may be a lens. The optical element 10 may be made of plastic or glass. The optical element 10 may be circular or it may have another shape. The optical element 10 and the optical system 20 may be disposed in the electronic device 1, so that a user may capture images and record video. The optical system 20 may hold the optical element 10 and drive the optical element 10 to move, so as to adjust the position of the optical element 10 to capture clear images. The optical element 10 and the optical system 20 are typically placed in the top region of the electronic device 1 to increase the display area of the electronic device 1.

The optical element 10 has an optical axis O. The optical axis O is an imaginary axis passing through the center of the optical element 10. When the optical element 10 and the optical system 20 are aligned, the optical axis O substantially overlaps the central axis of the optical system 20. Therefore, in the followings and in the drawings, the optical axis O of the optical element 10 may be used to illustrate or describe the related features of the optical system 20. It should be noted that, since the optical element 10 is movably placed in the optical system 20, the optical axis O may be not exactly overlap the central axis of the optical system 20 because of the movement, shake, rotation, tilt of the optical system 20. The optical system 20 may be connected to an external module, such as an image sensor module (e.g. a module that includes a charge-coupled detector (CCD)), so that the light entering the optical system 20 may be converted into an image on the external module.

Figure 3:
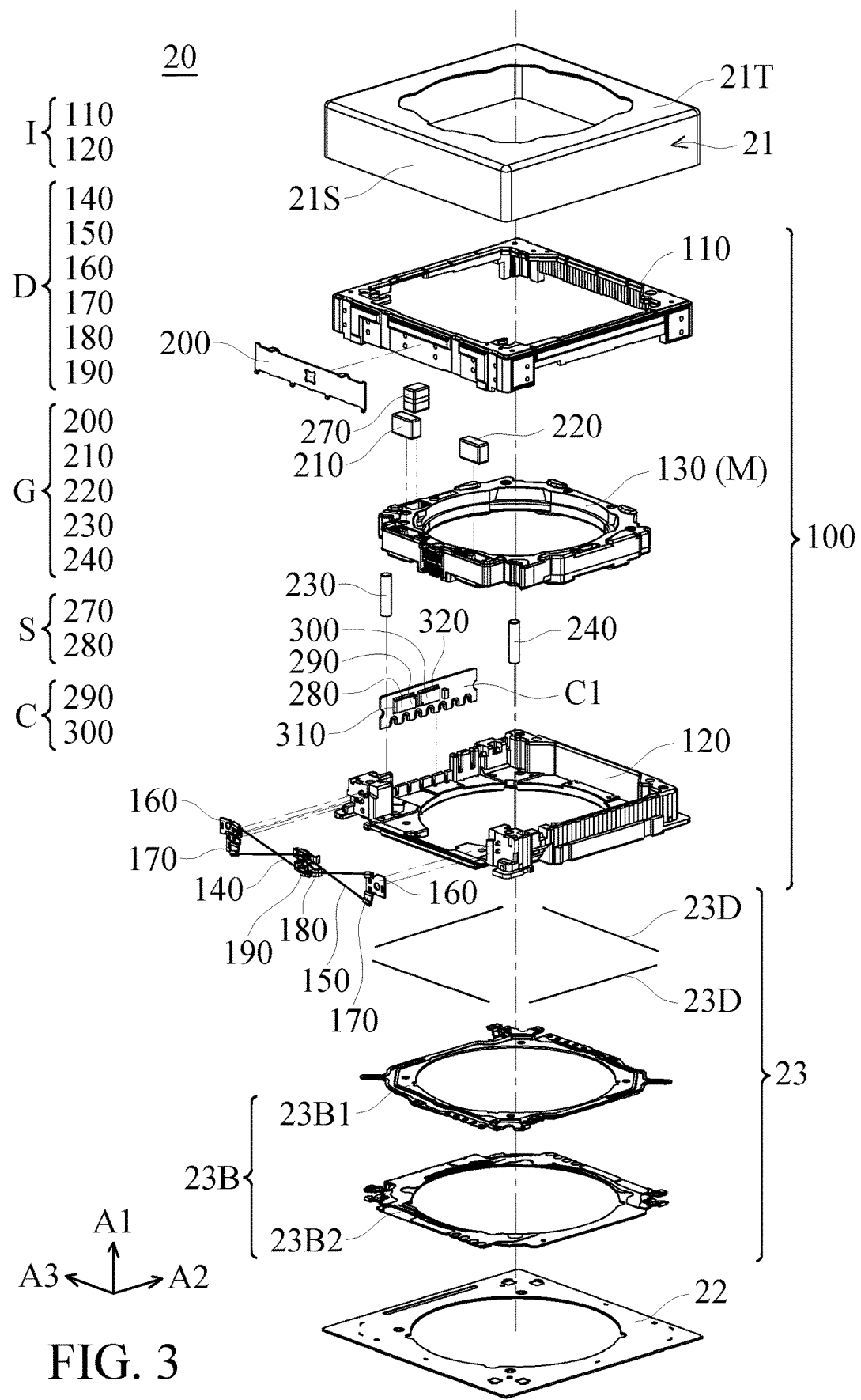
FIG. 3 is an exploded view of the optical mechanism.

Next, please refer to FIG. 3. FIG. 3 is an exploded view of the optical system 20. The optical system 20 includes a case 21, a base 22, drive module 23, and an optical mechanism 100. The case 21 and the base 22 are arranged along the optical axis O, and an accommodating space accommodating the optical mechanism 100 is formed by the case 21 and the base 22. The case 21 has a top wall 21T and four side walls 21S. The top wall 21T is perpendicular to the optical axis O. The side walls 21S extend in a direction that is parallel with the optical axis O from the edge of the top wall 21T. Compared to the base 22, the top wall 21T of the case 21 is closer to the incident light. The top wall 21T and the base 22 restrict the movement range of the optical mechanism 100.

The drive module 23 is located between the case 21 and the base 22, and the drive module 23 drives the optical mechanism 100 to move along a direction that is perpendicular to the optical axis O. The drive module 23 includes a main body 23B and four drive elements 23D. The main body 23 may further be divided into a first main body portion 23B1 and a second main body portion 23B2. In detail, the optical mechanism 100 is located on the first main body portion 23B1, and the second main body portion 23B2 is located on the base 22. The drive elements 23D are disposed on the first main body portion 23B1 and the second main body portion 23B2, and the drive elements 23D are connected to the first main body portion 23B1 and the second main body portion 23B2. In this embodiment, when viewed from the optical axis O, the four drive elements 23D do not cross or overlap each other. Additionally, the four drive elements 23D are symmetrically arranged. However, the drive elements 23D may not be symmetrically arranged if any deviation is produced during assembling. The drive elements 23D may be made of shape memory alloy (SMA), including an iron-based alloy, a copper-based alloy (for example, copper-zinc-aluminum alloy, copper-aluminum-nickel alloy), a titanium-nickel alloy, a titanium-palladium alloy, a titanium-nickel-copper alloy, a titanium-nickel-palladium alloy, a gold-cadmium alloy, a thallium-indium alloy or combination of any above-described shape memory alloy.

The shape memory alloy deforms when the temperature changes. Therefore, drive signal (e.g. current, voltage) may be applied to the four drive elements 23D by a power source. The driving signals may be the same or different. The temperature of the four drive elements 23D are controlled respectively, and the lengths of the four drive elements 23D are changed respectively. The lengths of the four drive elements 23D may be changed identically or differently. For example, when the drive signal is applied to the drive elements 23D to make the temperature of the drive elements 23D change, the drive elements 23D are lengthened or shortened to make the first main body portion 23B1 and the optical mechanism 100 on the first main body portion 23B1 move. Therefore, the positional relationship between the optical mechanism 100 and the case 21 is changed. When stopping applying drive signal, the drive elements 23D may be restored to their original lengths due to the characteristics of the shape memory alloy.

Figure 4:
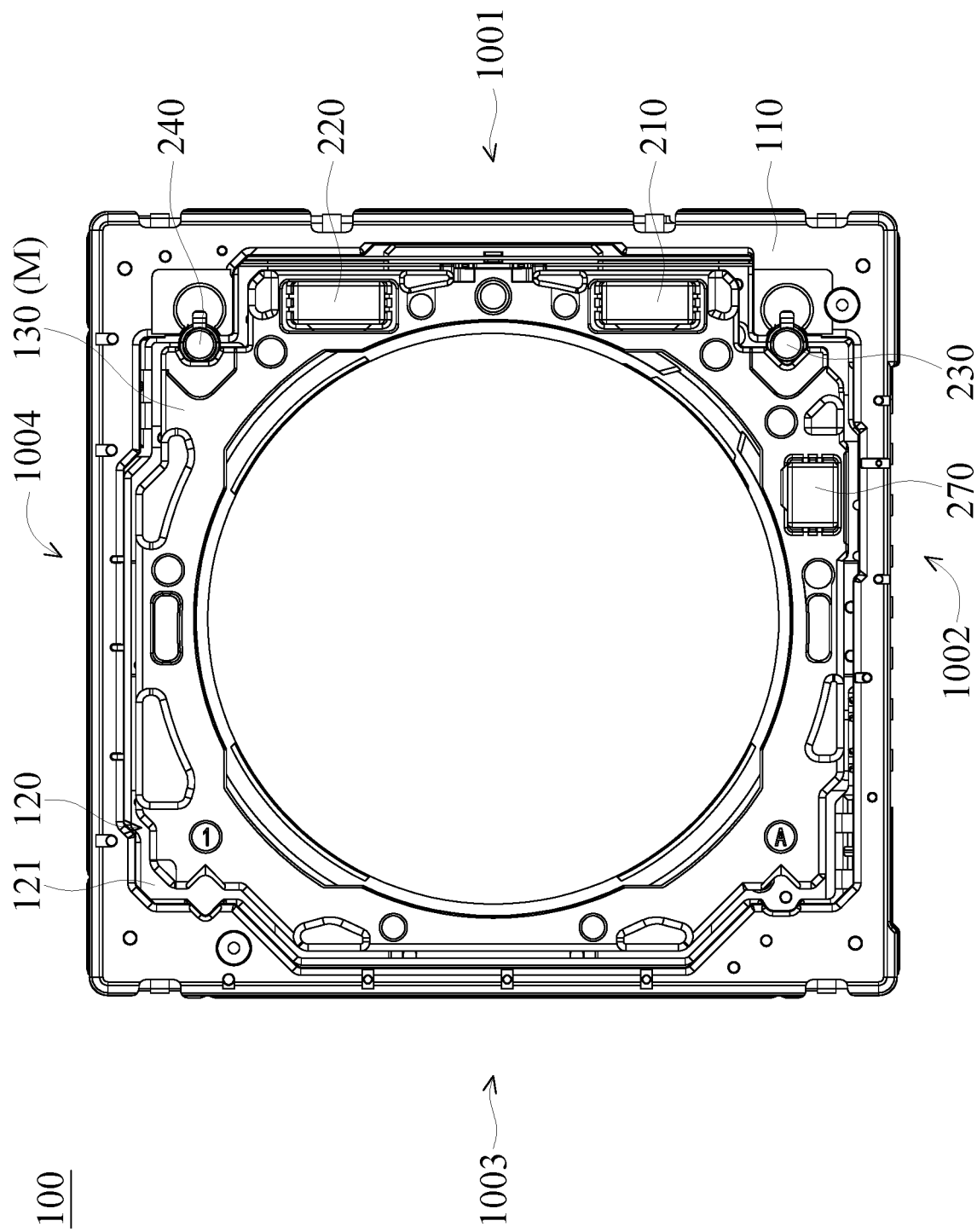
FIG. 4 is a top view of the optical mechanism.
Figure 5:
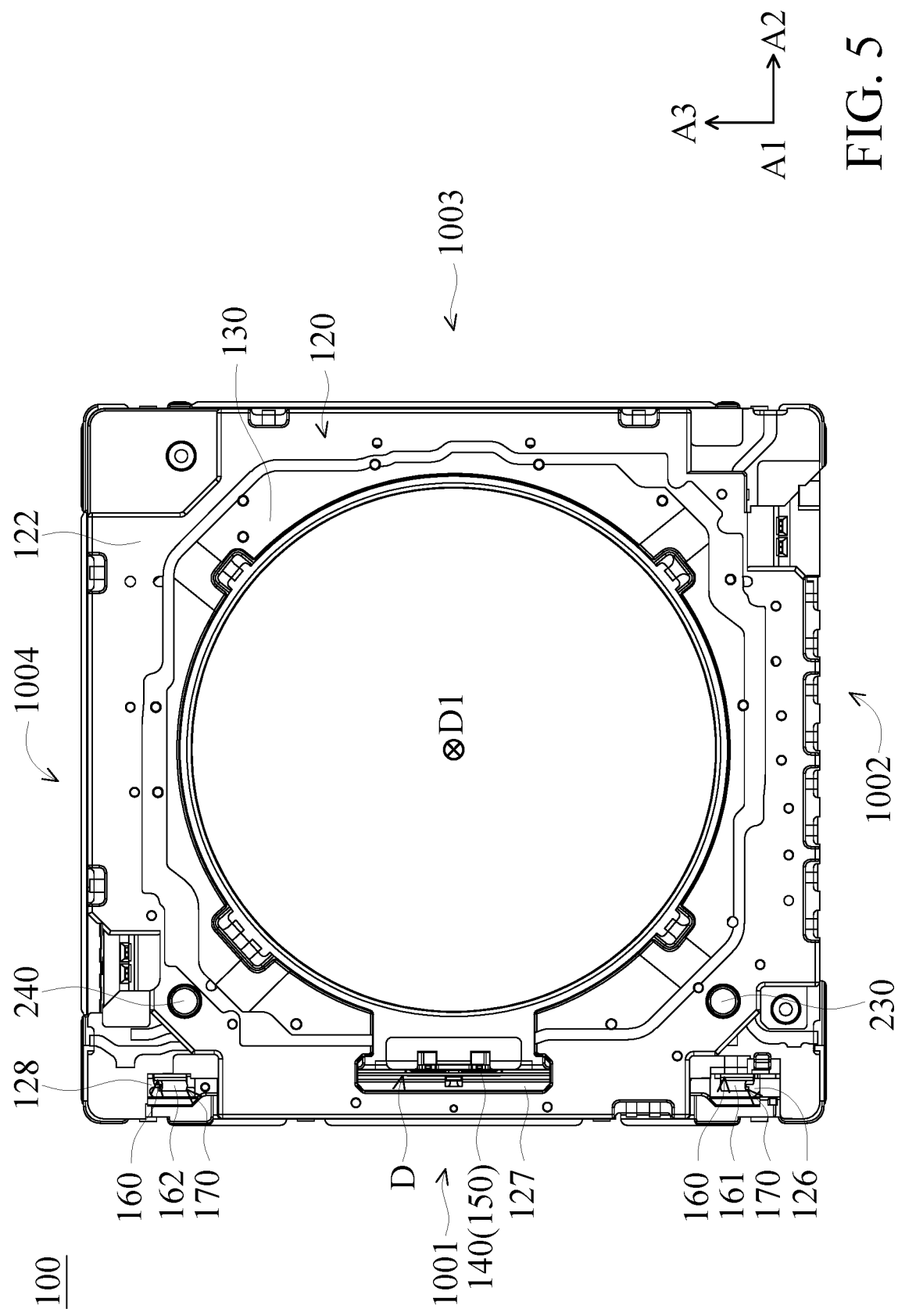
FIG. 5 is a bottom view of the optical mechanism.
Figure 6:
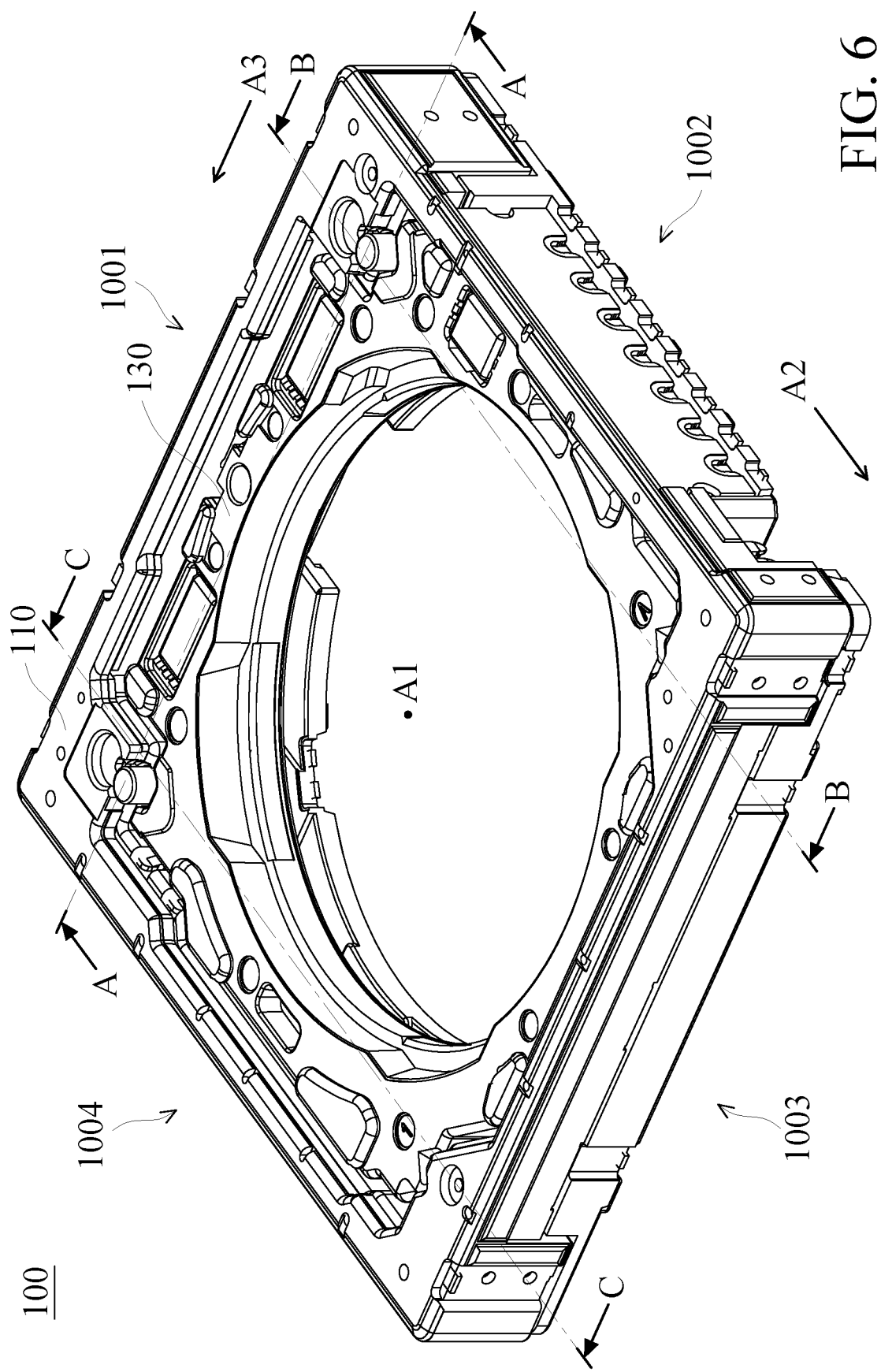
FIG. 6 to FIG. 9 are perspective views of the optical mechanism, in which the perspectives and the omitted elements are not exactly the same.

Next, in addition to FIG. 3, please also refer to FIG. 4 to FIG. 9. FIG. 4 is a top view of the optical mechanism 100. FIG. 5 is a bottom view of the optical mechanism 100. FIG. 6 to FIG. 9 are perspective views of the optical mechanism 100, in which the perspectives and the omitted elements are not exactly the same. When viewed from the optical axis O, the optical mechanism 100 is polygonal, such as quadrilateral. For ease of illustration, the four sides of the optical mechanism 100 are defined as a first side 1001, a second side 1002, a third side 1003, and a fourth side 1004, respectively. The first side 1001 is opposite to the third side 1003, and the second side 1002 is opposite to the fourth side 1004. The first side 1001 is substantially parallel with the third side 1003, and the second side 1002 is substantially parallel with the fourth side 1004. The first side 1001, the second side 1002, the third side 1003, and the fourth side 1004 are substantially perpendicular to a first axis A1. When viewed from the first axis A1, the second side 1002 and the fourth side 1004 are substantially perpendicular to a second axis A2, and the second side 1002 and the fourth side 1004 extend along the second axis A2. When viewed from the first axis A1, the first side 1001 and the third side 1003 are substantially perpendicular to a third axis A3, and the first side 1001 and the third side 1003 extend along the third axis A3.

The optical mechanism 100 includes an immovable part I, a movable part M, a drive assembly D, a guidance assembly G, a first circuit assembly C1, a second circuit assembly C2 (please refer to FIG. 11 and FIG. 22), a sensing assembly S, and a control assembly C. The movable part M is connected to the optical element 10. The movable part M is movable relative to the immovable part I. The drive assembly D drives the movable part M to move relative to the immovable part I along the first axis A1. The first axis A1 is substantially parallel with the optical axis O. The guidance assembly G may guide the movement of the movable part M relative to the immovable part I. The current may be supplied and transmitted by the first circuit assembly C1 and the second circuit assembly C2. The sensing assembly S may detect the movement of the movable part M relative to the immovable part I. The control assembly C may control the drive assembly D. The description in the present disclosure is merely an example, and the elements may be added to or removed as needed. Also, for clear illustration, some elements may be omitted in the drawings.

In this embodiment, the immovable part I includes a frame 110 and a bottom 120. The movable part M includes a holder 130. The drive assembly D includes a first drive element 140, a second drive element 150, two first drive element fixing elements 160, two second drive element fixing elements 170, a first contact element 180, and a second contact element 190. The guidance assembly includes a magnetically-permeable element 200, a first magnetic element 210, a second magnetic element 220, a first guidance element 230, a second guidance element 240. The first circuit assembly C1 includes a plurality of first circuits 250. The second circuit assembly C2 includes a plurality of second circuits 260 (please refer to FIG. 11 and FIG. 22). The sensing assembly S includes a reference element 270 and a sensing element 280 corresponding to the reference element 270. The control assembly C includes a first control unit 290 and a second control unit 300, the sensing element 280 and the first control unit 290 may be packaged in a first package 310, and the second control unit may be packaged in a second package 320. In some embodiments, the optical mechanism 100 further includes a strengthening element 330 (please refer to FIG. 10) and an external connection terminal 340 (please refer to FIG. 11 and FIG. 22).

Figure 10:
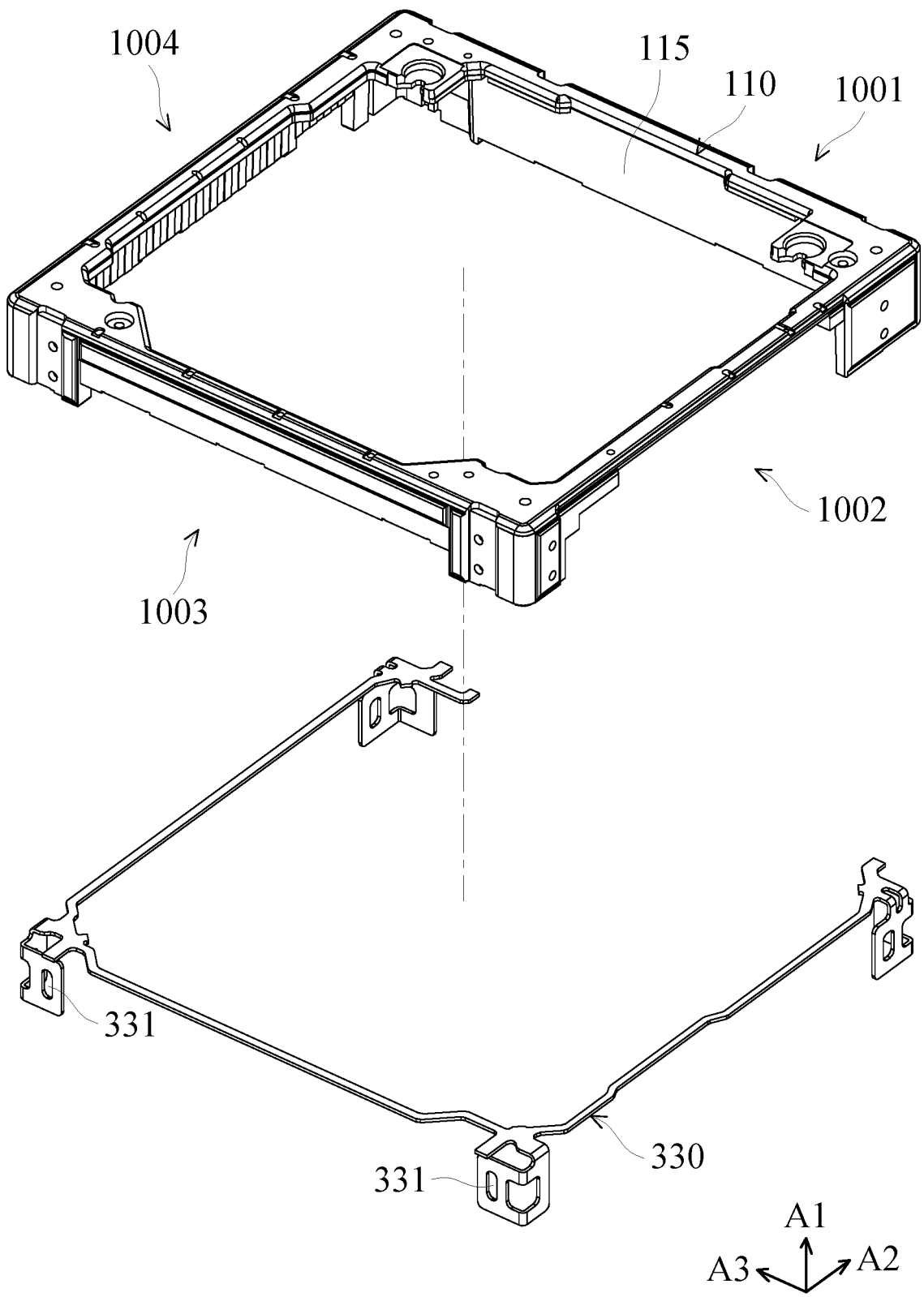
FIG. 10 is a schematic view of the frame and the strengthening element.
Figure 11:
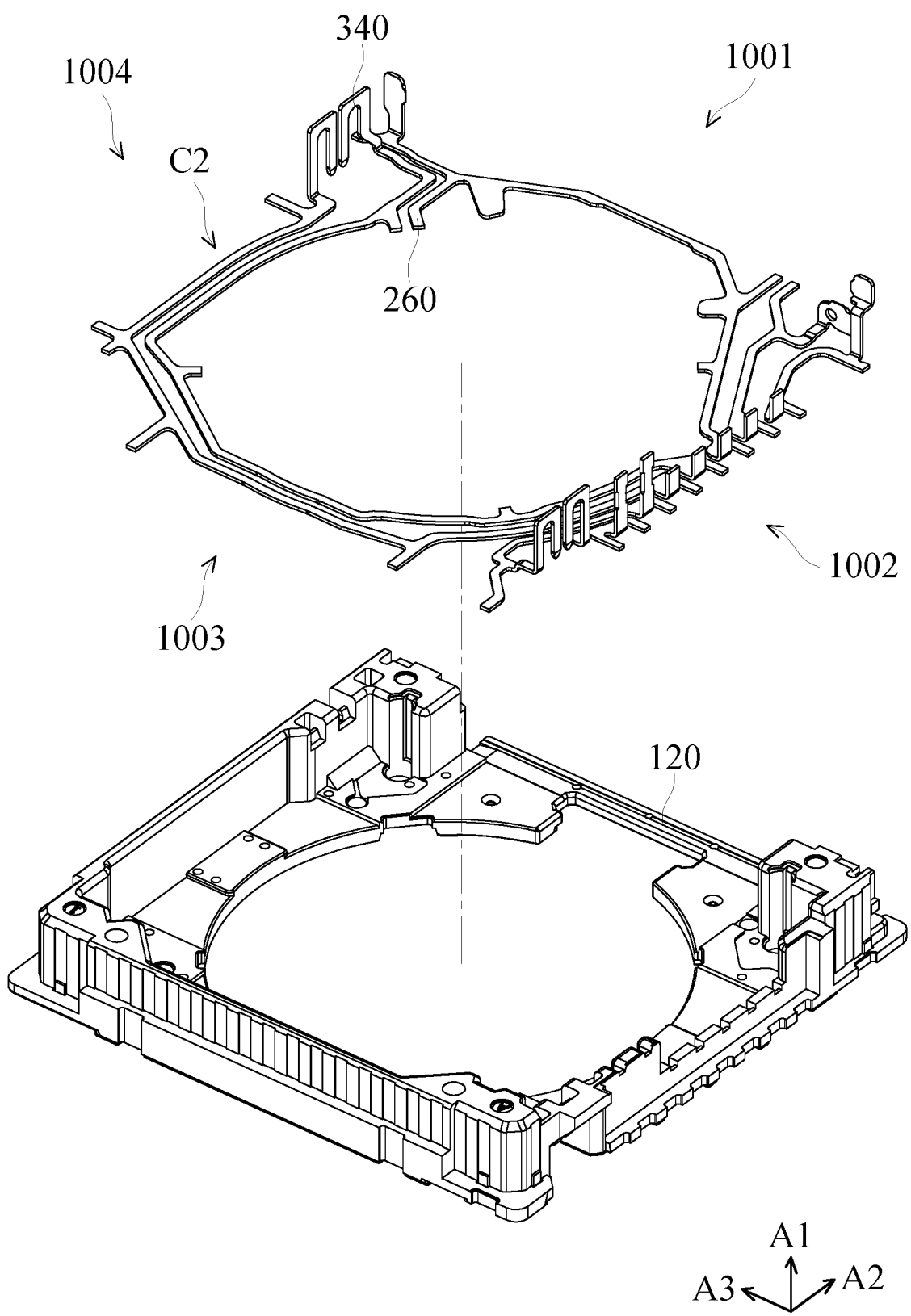
FIG. 11 is a schematic view of the bottom and the second circuit assembly.

Next, in addition to FIG. 3 to FIG. 9, please also refer to FIG. 10 and FIG. 11 to know the immovable part I. FIG. 10 is a schematic view of the frame 110 and the strengthening element 330. FIG. 11 is a schematic view of the bottom 120 and the second circuit assembly C2. The frame 110 is disposed above the bottom 120. The frame 110 may be immovably connected to the bottom 120. The frame 110 has a receiving space that receives the movable part M. In detail, the movable part M, the drive assembly D, the guidance assembly G, the first circuit assembly C1, and the second circuit assembly C2 may be disposed between the frame 110 an the bottom 120.

In some embodiments, the frame 110 includes a plastic material, and the strengthening element 330 includes a metal material. The strengthening element 330 may be formed in the frame 110 by methods such as insert molding. At least part of the strengthening element 330 is embedded and not revealed from the frame 110. The strengthening element 330 strengthens the mechanical strength of the frame. In addition, the strengthening element 330 may include one or more perforation 331. When the frame 110 and the strengthening element 330 are formed, some melted plastic that is part of the frame 110 may fill the perforation 331 of the strengthening element 330 under high temperature. Therefore, the contact area between the frame 110 and the strengthening element 330 is increased, and thus the connection between the frame 110 and the strengthening element 330 is strengthened. It should be noted that, there is a gap between the strengthening element 330 and the magnetically-permeable element 200, so short circuits are prevented.

In some embodiments, the bottom 120 includes a plastic material, and the second circuits 260 of the second circuit assembly C2 include a metal material. The second circuits 260 of the second circuit assembly C2 may be formed in the bottom 120 by methods such as insert molding. At least part of the second circuits 260 are embedded and not revealed from the bottom 120.

Figure 12:
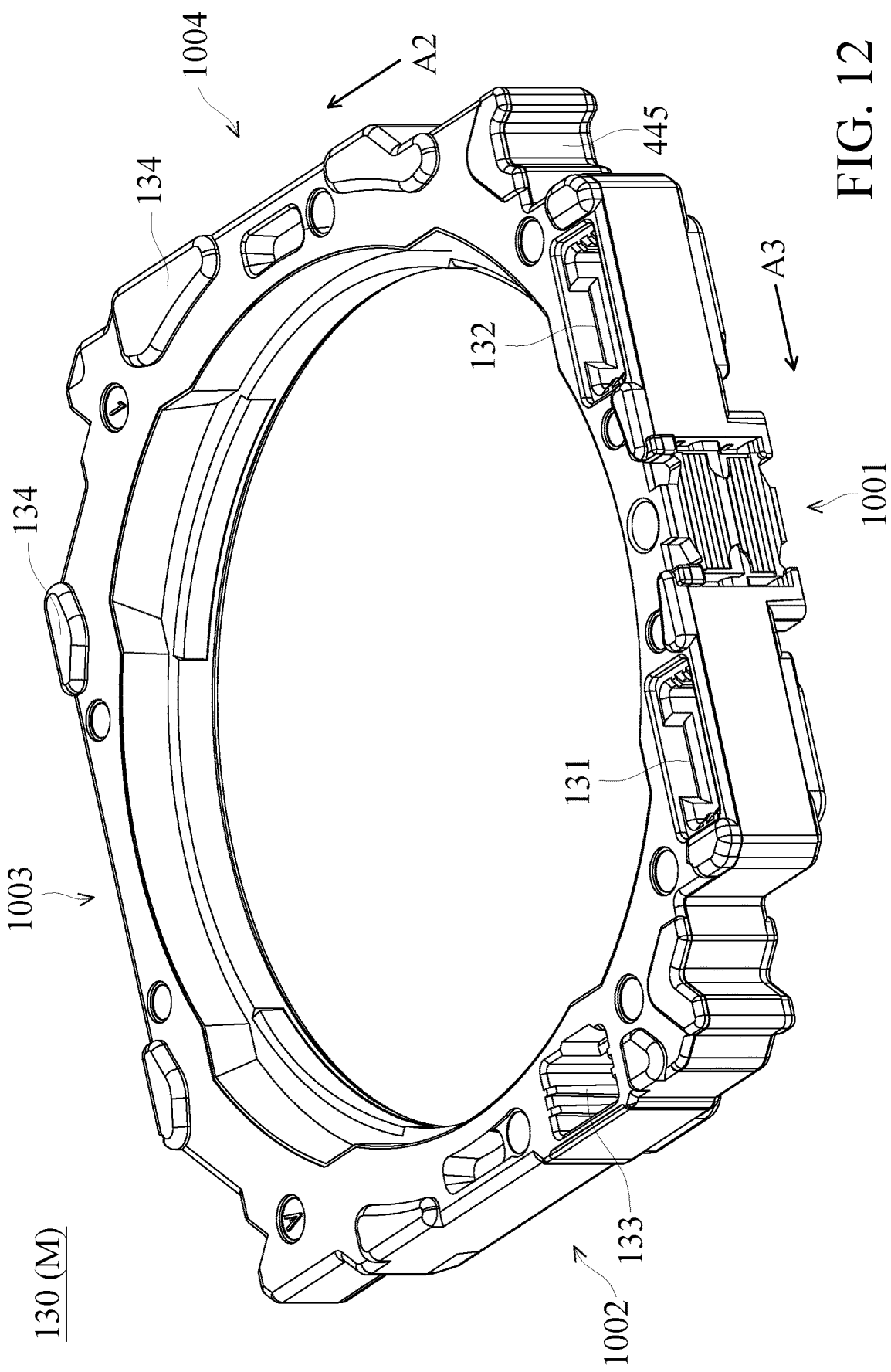
FIG. 12 is a perspective view of the holder.

Next, in addition to FIG. 3 to FIG. 9, please also refer to FIG. 12 to know the movable part M. FIG. 12 is a perspective view of the holder 130. When viewed from the direction of the incident light, the movable part M is completely revealed from the immovable part I. In other words, when viewed from the direction of the incident light, the holder 130 is not blocked by the frame 110 and the bottom 120. The holder 130 is not in direct contact with the frame 110 and the bottom 120. The holder 130 is hollow for holding the optical element 10. In some embodiments, the holder 130 is made of a plastic material.

The holder 130 may include a first magnetic element receiving portion 131, a second magnetic element receiving portion 132, and a reference element receiving portion 133. The first magnetic element receiving portion 131, the second magnetic element receiving portion 132, and the reference element receiving portion 133 are located on the top surface of the holder 130. The first magnetic element receiving portion 131 and the second magnetic element receiving portion 132 are located on the first side 1001, and the reference element receiving portion 133 is located on the second side 1002. The first magnetic element receiving portion 131, the second magnetic element receiving portion 132, and the reference element receiving portion 133 receive the first magnetic element 210, the second magnetic element 220, and the reference element 270, respectively. In some embodiments, the first magnetic element receiving portion 131, the second magnetic element receiving portion 132, and the reference element receiving portion 133 are recesses.

To prevent the holder 130 from being damaged when the movement of the holder 130 reaches the limit, the holder 130 may include one or more stoppers. In this embodiment, the holder 130 includes a plurality of upper stoppers 134. The upper stoppers 134 protrude from the top surface of the holder 130. In particular, the upper stoppers 134 are closer to the top wall 21T of the case 21 than the top surface of the holder 130. The upper stoppers 134 may restrict the movement range of the holder 130. For example, when the holder 130 moves toward the top wall 21T of the case 21 and reaches the limit, the upper stoppers 134 of the holder 130 may be in contact with the top wall 21T of the case 21.

Figure 13:
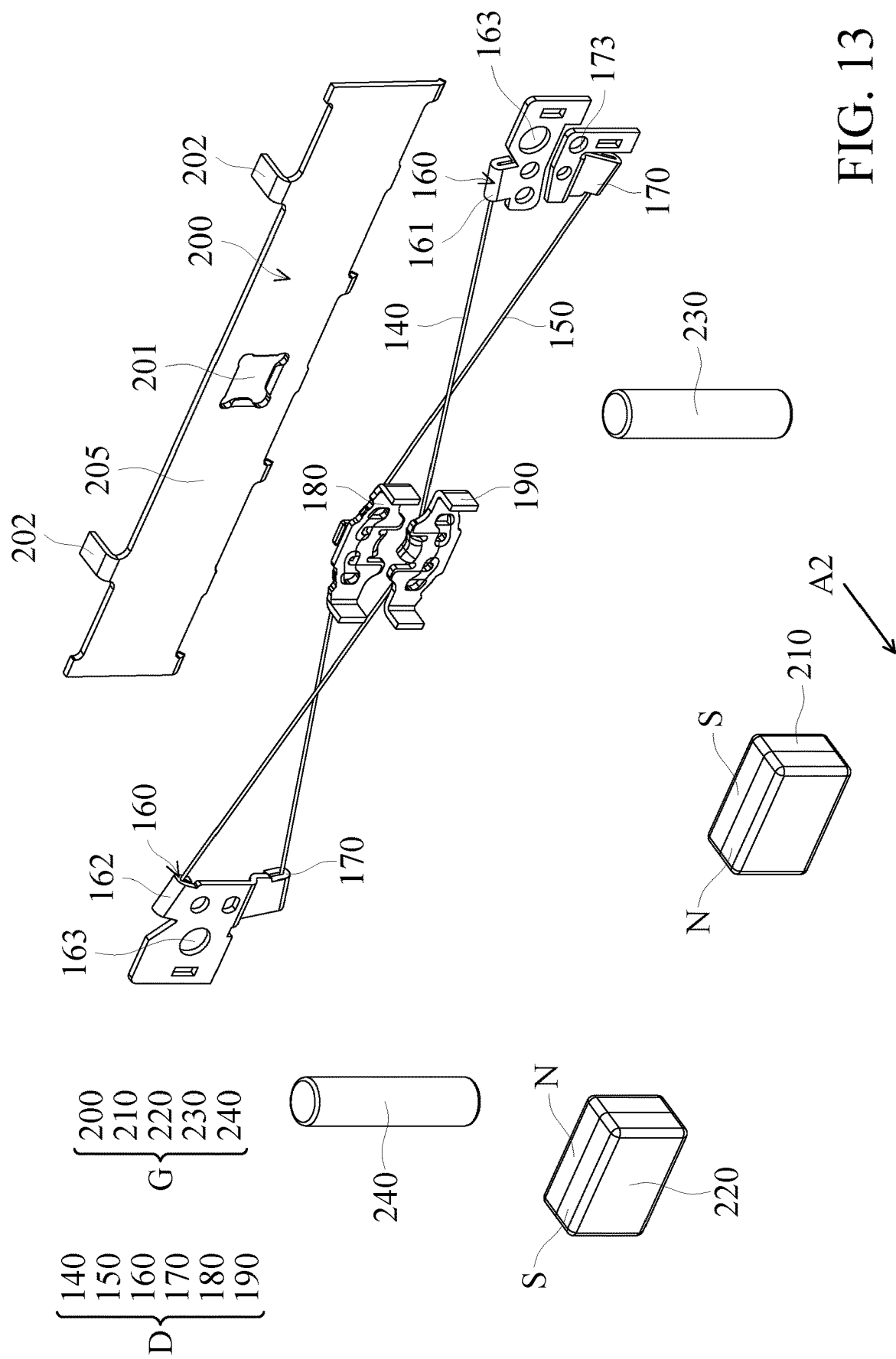
FIG. 13 and FIG. 14 are schematic views of the drive assembly and the guidance assembly from different perspectives.
Figure 14:
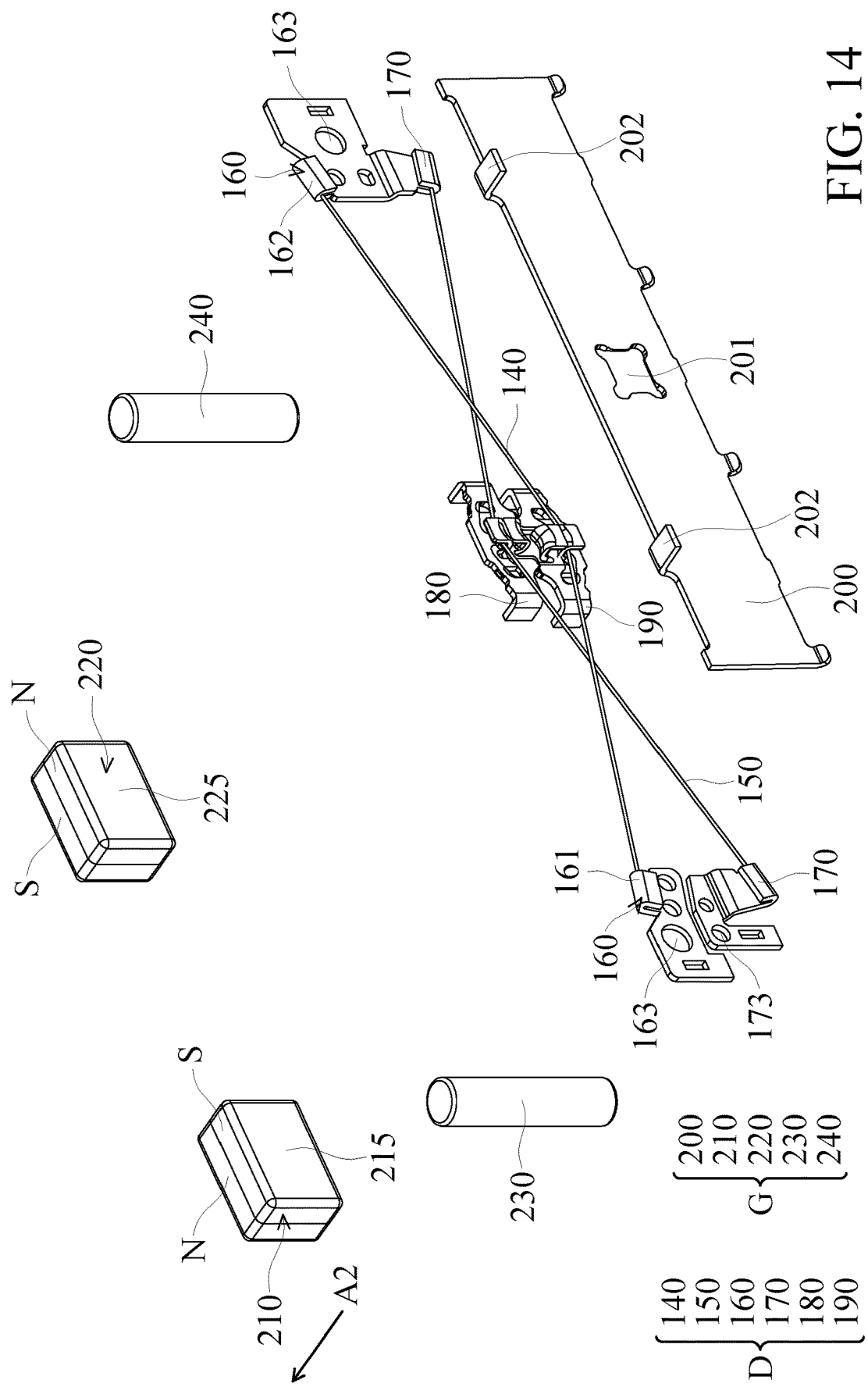

Next, in addition to FIG. 3 to FIG. 9, please also refer to FIG. 13 and FIG. 14 to know the drive assembly D and the guidance assembly G. FIG. 13 and FIG. 14 are schematic views of the drive assembly D and the guidance assembly G from different perspectives. When viewed from the first axis A1, the drive assembly D and the guidance assembly G are located on the first side 1001.

The first drive element 140 and the second drive element 150 both have elongated structures, but they have different configuration. For example, the shape of the first drive element 140 is different from that of the second drive element 150. In this embodiment, the first drive element 140 is V-shaped and the second drive element 150 is reverse-V-shaped. The first drive element 140 and the second drive element 150 may be made of SMA, and they may include similar or the same material of the drive elements 23D. The first drive element fixing element 160 includes a first clamping portion 161 fixing the first end of the first drive element 140 and a second clamping portion 162 fixing the second end of the first drive element 140. The second drive element fixing element 170 may also include clamping structures for fixing the ends of the second drive element 150. The configuration may facilitate heat dissipation. In addition, one or more holes 163 and 173 may be formed around the first drive element fixing element 160 and the second drive element fixing element 170 to further facilitate heat dissipation of the first drive element 140 and the second drive element 150. It should be noted that, the holes 163 and 173 may be slightly far away from the first drive element 140 and the second drive element 150 to prevent excessive loss of the energy for driving the first drive element 140 and the second drive element 150.

The two ends of the first drive element 140 and the second drive element 150 are fixed, and the central region of the first drive element 140 and the second drive element 150 is in direct contact with the first contact element 180 and the second contact element 190, respectively. When the drive signal (e.g. the current or the voltage) is applied to the first drive element 140 and the second drive element 150, the lengths of the first drive element 140 and the second drive element 150 may be controlled. For example, when the length of the first drive element 140 is shortened, the holder 130 may be driven to move toward the top wall 21T of the case 21 (upwardly) along the first axis A1 via the first contact element 180 that is in direct contact with the first drive element 140 and the holder 130. Also, when the length of the second drive element 150 is shortened, the holder 130 may be driven to move toward the base 22 (downwardly) along the first axis A1 via the second contact element 180 that is in direct contact with the second drive element 150 and the holder 130.

Figure 7:
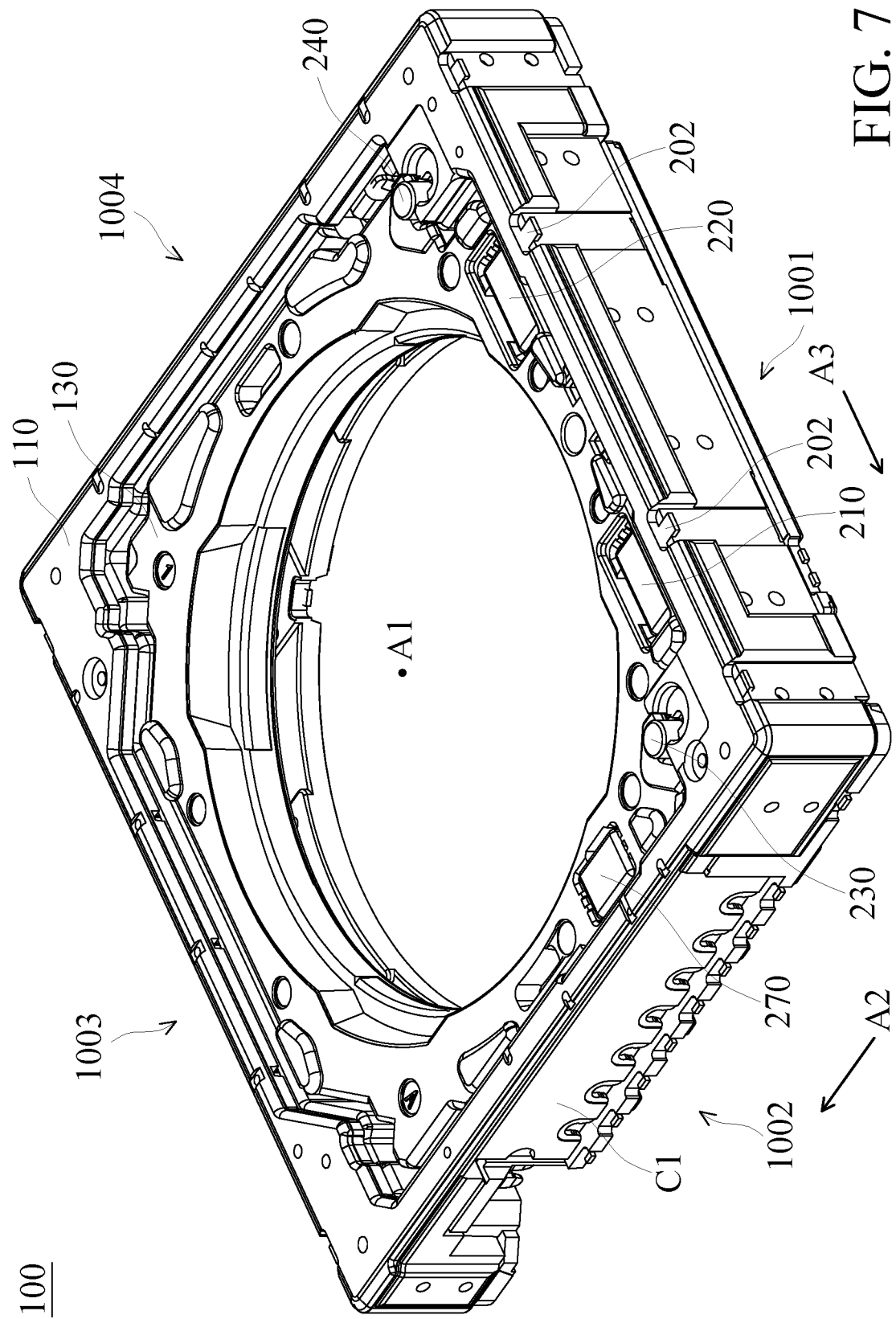
Figure 8:
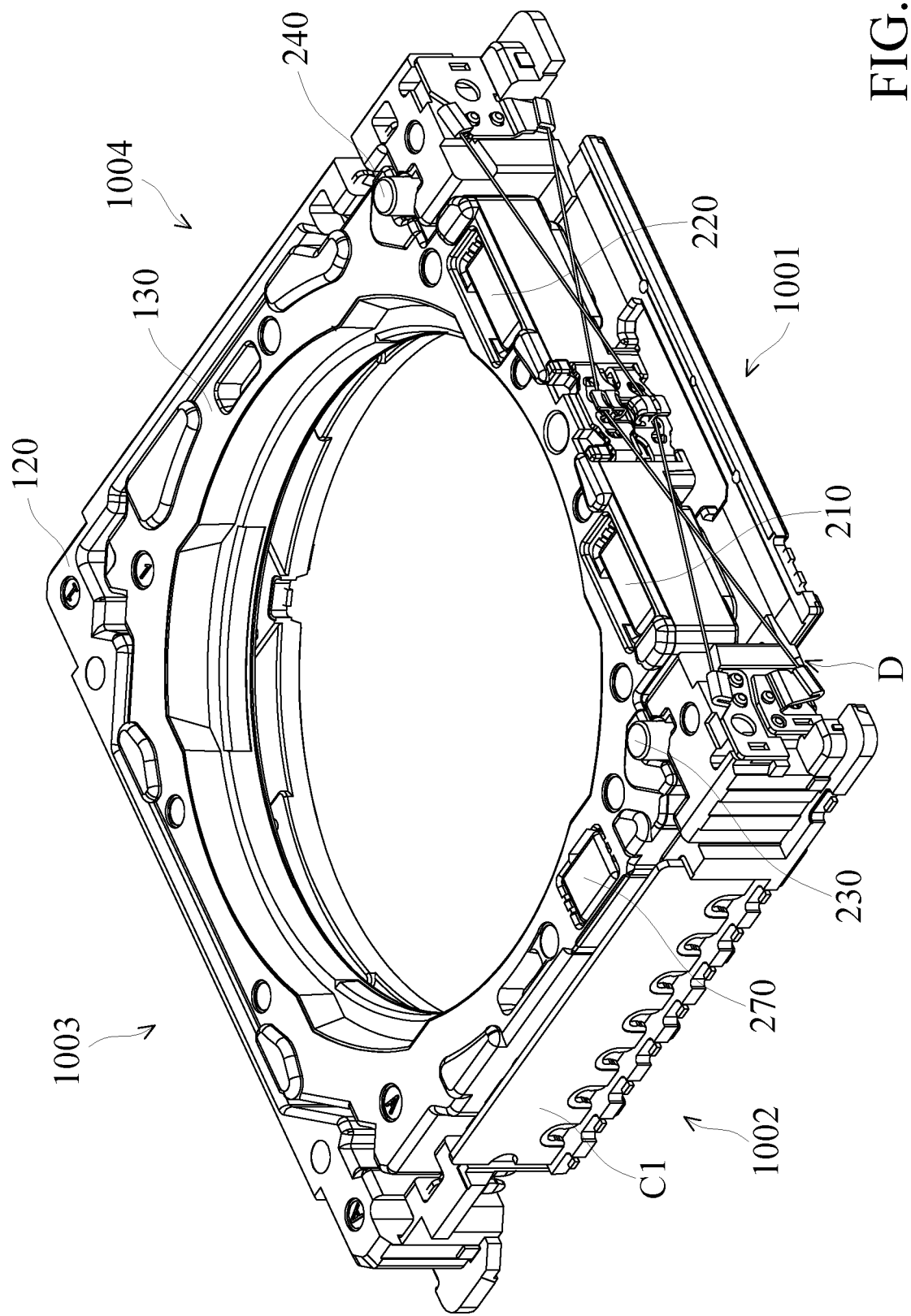
Figure 9:
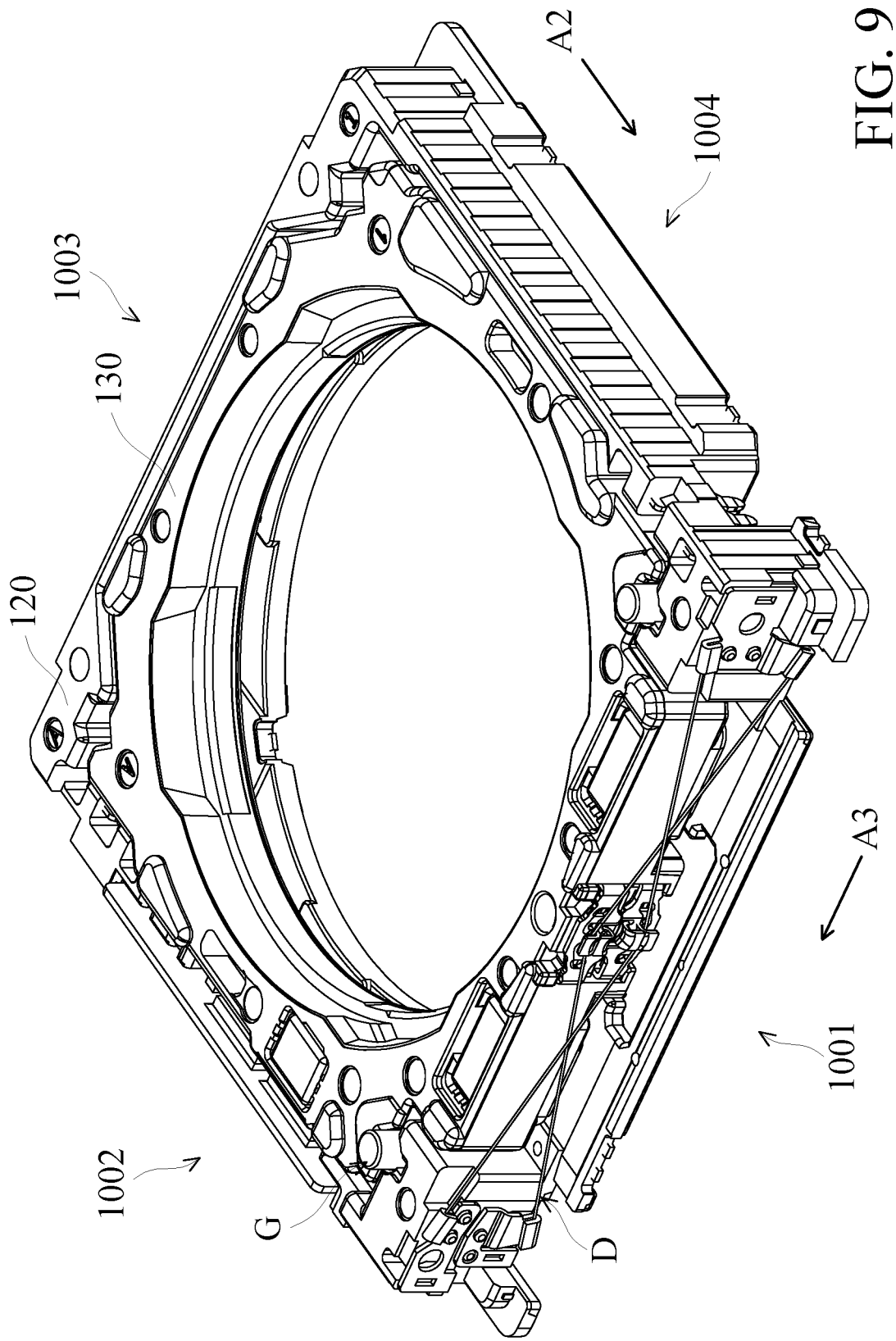

The guidance assembly G may guide the movable part M to move relative to the immovable part I along the first axis A1. The magnetically-permeable element 200 is immovably disposed in the frame 110. The frame 110 may include a fixing element 115 (please refer to FIG. 10) fixing the magnetically-permeable element 200. The magnetically-permeable element 200 includes an opening 201 corresponding to the fixing element 115 of the frame 110 to strengthen the connection between the magnetically-permeable element 200 and the frame 110. Also, the opening 201 may be irregular shaped, such as polygonal with inclined sides, to further increase the contact area between the magnetically-permeable element 200 and the frame 110 to strengthen the connection between the magnetically-permeable element 200 and the frame 110. Furthermore, the magnetically-permeable element 200 may include an engagement portion 202, so that the magnetically-permeable element 200 may be better fixed to the fixing element 115 of the frame 110. At least part of the magnetically-permeable element 200 is embedded and not revealed from the frame 110. In some embodiments, the engagement portion 202 is revealed from the frame 110 (as shown in FIG. 7).

The magnetically-permeable element 200 includes a magnetically-permeable element surface 205 facing the first drive element 140 and the first magnetic element 210. In particular, the first drive element 140 is located between the magnetically-permeable element surface 205 of the magnetically-permeable element 200 and the first magnetic element surface 215 of the first magnetic element 210. The magnetically-permeable element surface 205 is revealed from the frame 110. The magnetically-permeable element 200 include a magnetically-permeable material, so that the magnetically-permeable element 200 may be attracted to the first magnetic element 210 and the second magnetic element 220. A magnetically-permeable material means a material that has magnetic permeability. For example, a magnetically-permeable material may be a ferromagnetic material, such as Fe, Ni, Co, and an alloy thereof.

Either of the first magnetic element 210 and the second magnetic element 220 may be a magnet. The first magnetic element 210 includes a first pair of magnetic poles. The first pair of magnetic poles includes a north magnetic pole and a south magnetic pole (only illustrated in FIG. 13 and FIG. 14) arranged along the second axis A2. The first magnetic element 210 includes a first magnetic element surface 215 facing the magnetically-permeable element 200, and the first magnetic element surface 215 is perpendicular to the second axis A2. The second magnetic element 220 includes a second pair of magnetic poles. The second pair of magnetic poles includes a north magnetic pole and a south magnetic pole (only illustrated in FIG. 13 and FIG. 14) arranged along the second axis A2. The second magnetic element 220 includes a second magnetic element surface 225 facing the magnetically-permeable element 200, and the second magnetic element surface 215 is perpendicular to the second axis A2. It should be noted that, the arrangement direction of the north magnetic pole and the south magnetic pole of the first pair of magnetic poles of the first magnetic element 210 is opposite to the arrangement direction of the north magnetic pole and the south magnetic pole of the second pair of magnetic poles of the second magnetic element 220. The arrangement of the magnetic poles may increase the generated magnetic lines of force and strengthen the attractive force between the first magnetic element 210 and the second magnetic element 220 and the magnetically-permeable element 200 by circulation of magnetic field.

The first guidance element 230 and the second guidance element 240 are located on the first side 1001. The first guidance element 230 and the second guidance element 240 may have substantially the same structure. When viewed from the first axis A1, the area of the first guidance element 230 is substantially the same as that of the second guidance element 240. The first guidance element 230 and the second guidance element 240 may each have an elongated structure, such as a rod or a stick. The first guidance element 230 and the second guidance element 240 may extend in the first direction A1 and pass through at least part of the frame 110, the bottom 120, and the holder 130.

Figure 19:
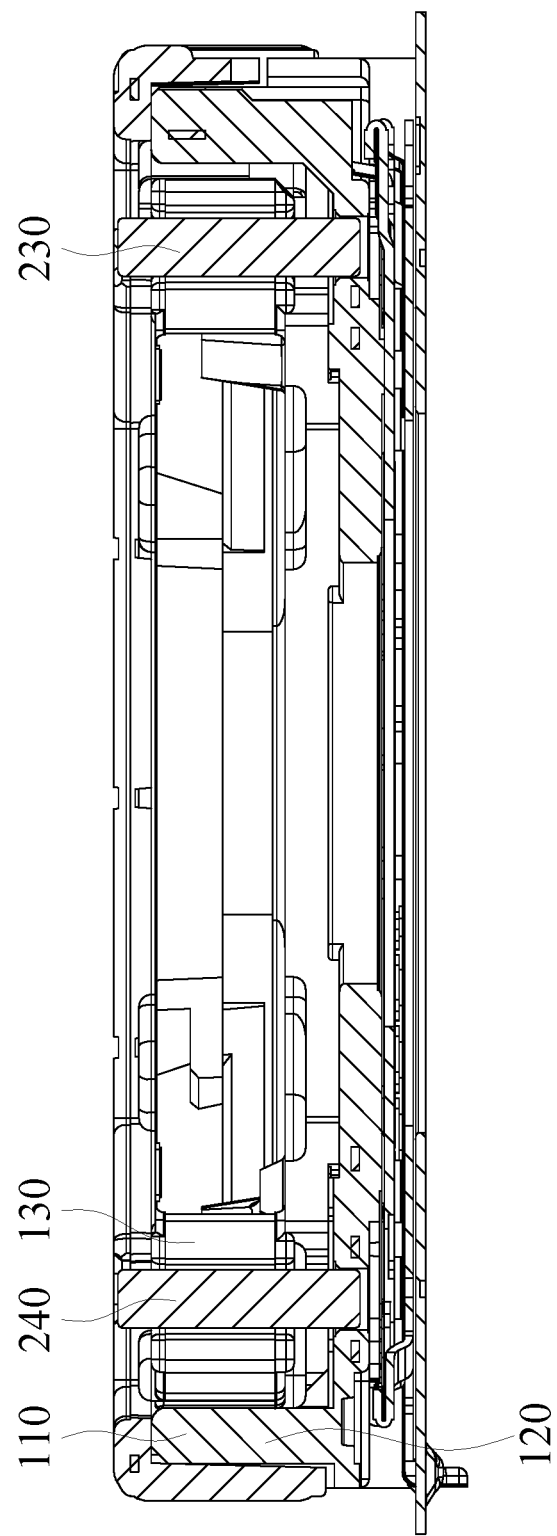
FIG. 19 and FIG. 20 are cross-sectional views of the optical mechanism taken along the line A-A and the line B-B of FIG. 6, respectively.
Figure 20:
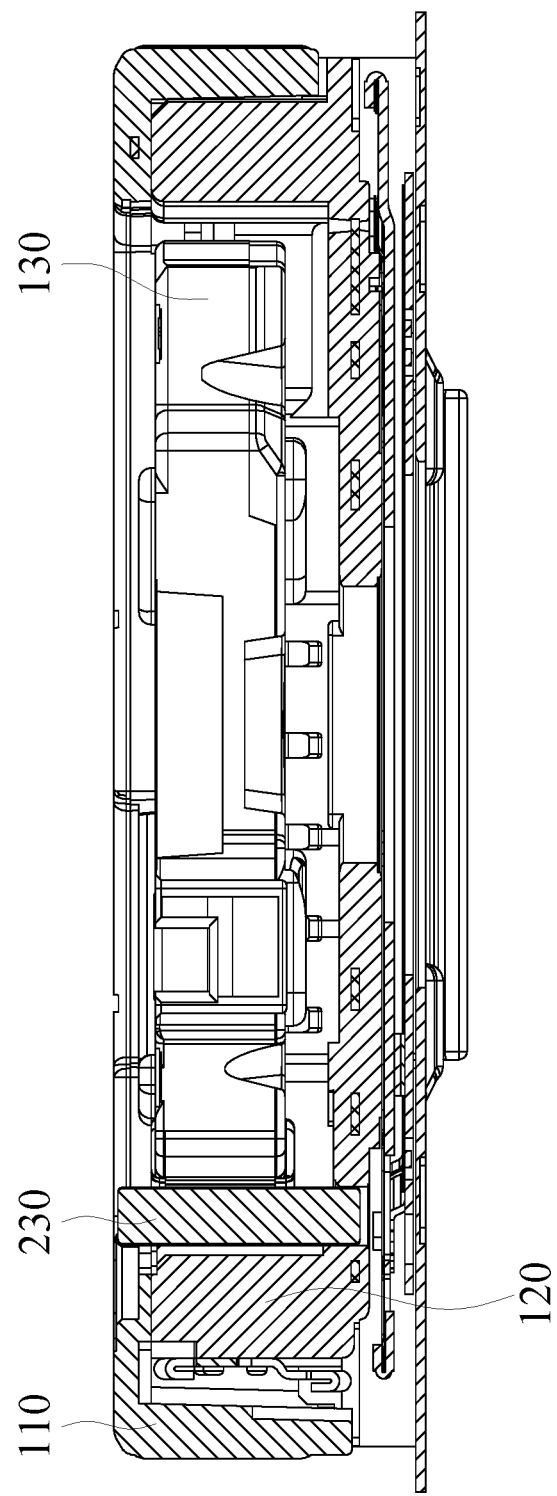

Next, please refer to FIG. 15 to FIG. 20 to know how the first guidance element 230 and the second guidance element 240 are received in the optical mechanism 100. FIG. 15 to FIG. 18 are enlarged views of part of the optical mechanism 100, in which the perspectives and the omitted elements are not exactly the same. FIG. 19 and FIG. 20 are cross-sectional views of the optical mechanism 100 taken along the line A-A and the line B-B of FIG. 6, respectively. The guidance assembly G includes a first receiving portion 410, a second receiving portion 420, a third receiving portion 430, a fourth receiving portion 440, a fifth receiving portion 450, and a sixth receiving portion 460. Foe ease of description, the first receiving portion 410 to the sixth receiving portion 460 are referred to part of the guidance assembly G. However, it should be noted that, the first receiving portion 410 to the sixth receiving portion 460 are formed on the frame 110, the bottom 120, or the holder 130. In detail, the first receiving portion 410 and the fourth receiving portion 440 are immovably disposed on the movable part M (the holder 130). The second receiving portion 420 and the fifth receiving portion 450 are immovably disposed on the bottom 120. The third receiving portion 430 and the sixth receiving portion 460 are immovably disposed on the frame 110.

The first receiving portion 410, the second receiving portion 420, and the third receiving portion 430 receive the first guidance element 230, and each of them has a concave structure corresponding to the first guidance element 230. The first receiving portion 410 and the second receiving portion 420 are arranged along the second axis A2. The first receiving portion 410 and the third receiving portion 430 are arranged along the second axis A2. The second receiving portion 420 and the third receiving portion 430 are arranged along the first axis A1.

Figure 15:
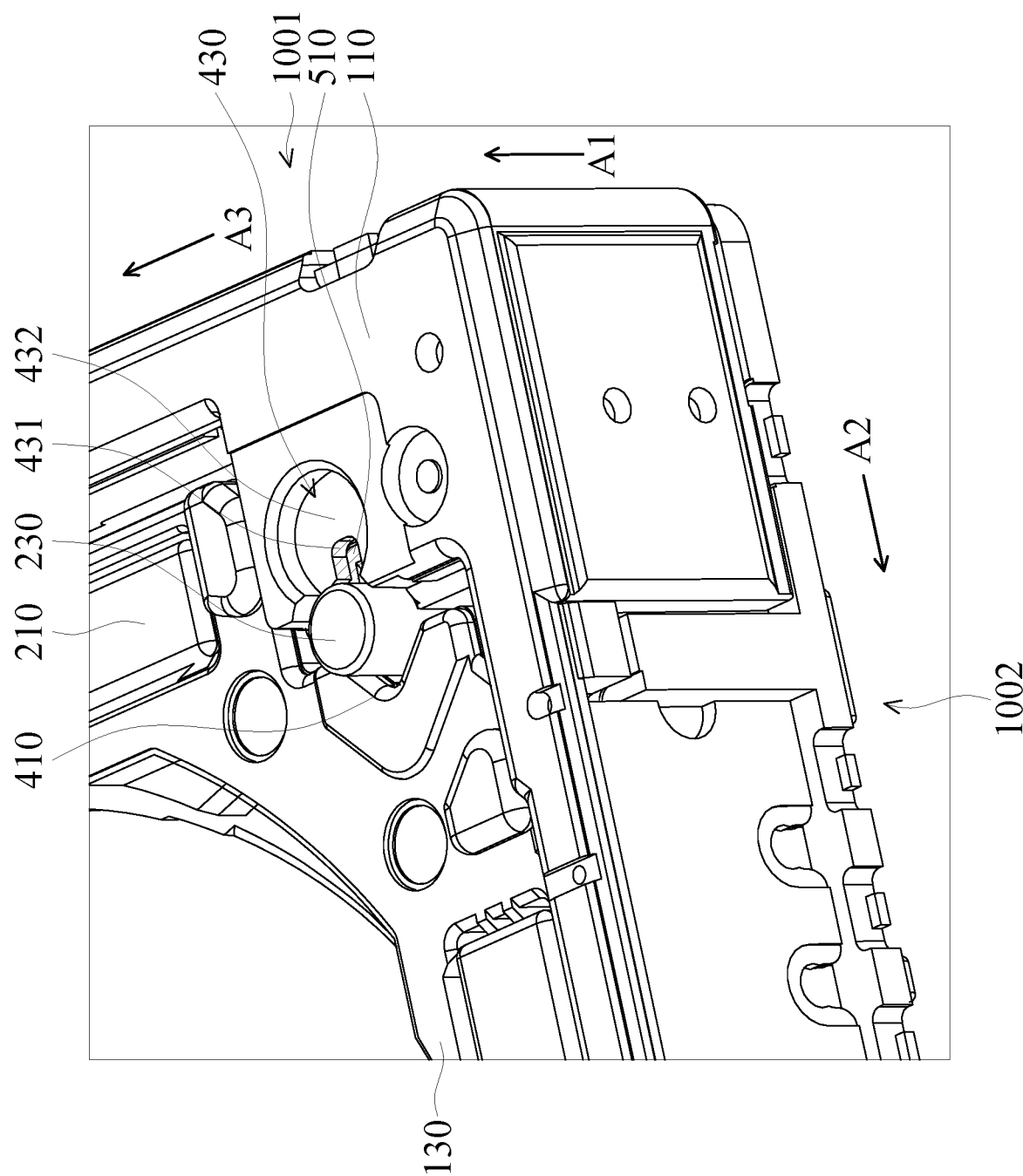
FIG. 15 to FIG. 18 are enlarged views of part of the optical mechanism, in which the perspectives and the omitted elements are not exactly the same.
Figure 16:
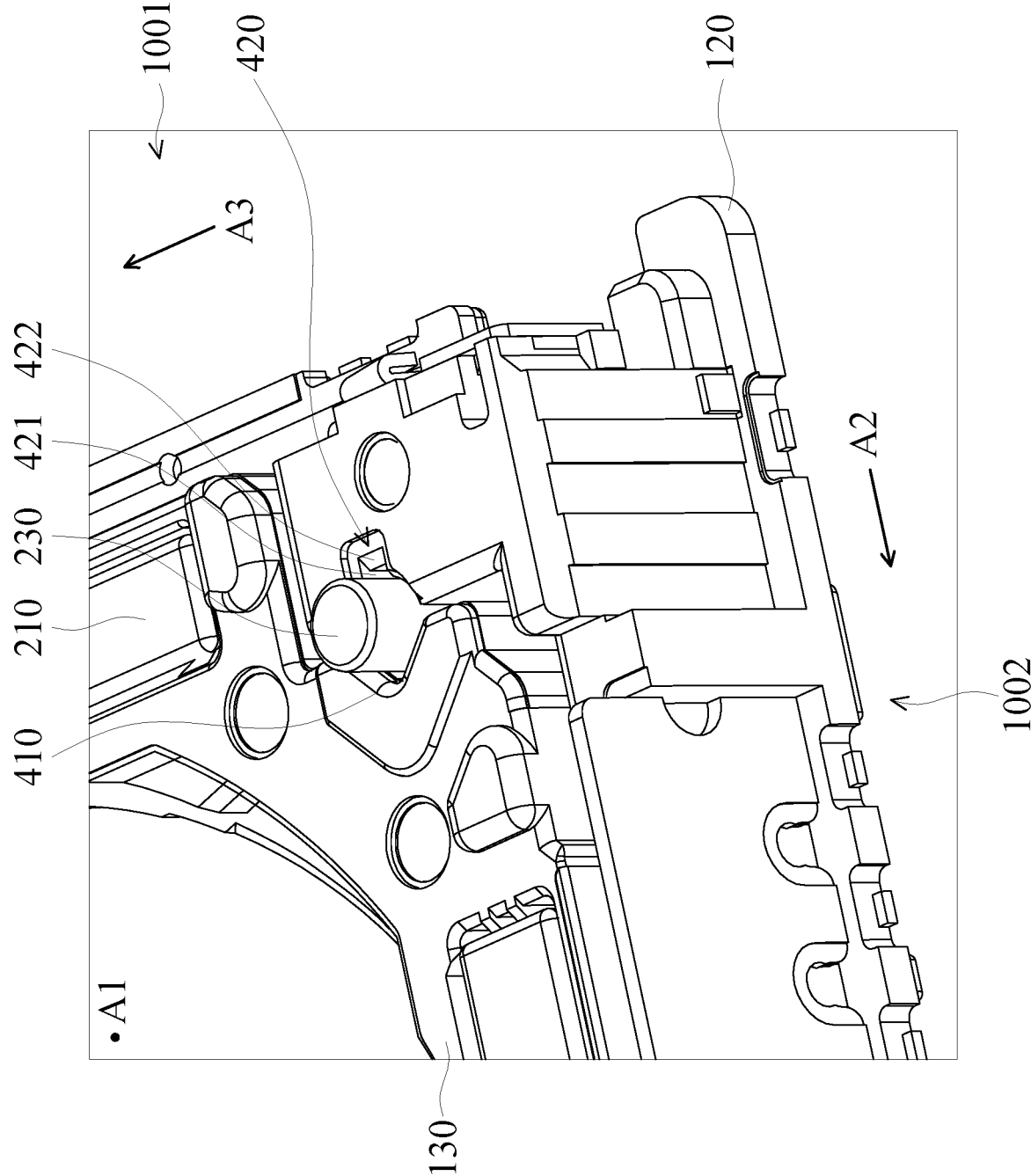

In some embodiments, the optical mechanism 100 further includes a first adhesive element 510 (only schematically illustrated in FIG. 15). The first guidance element 230 is immovably connected to the second receiving portion 420 via the first adhesive element 510, and the first adhesive element 510 is in direct contact with the frame 110 and the bottom 120. In some embodiments, the minimum distance between the second receiving portion 420 and the first guidance element 230 is less than the minimum distance between the third receiving portion 430 and the first guidance element 230. That is, the second receiving portion 420 on the bottom 120 is closer to the first guidance element 230 than the third receiving portion 430 on the frame 110. In this way, it is easier for the first adhesive element 510 to flow to the second receiving portion 420 on the bottom 120 from the third receiving portion 430 on the frame 110. Also, when applying the first adhesive element 510 to affix the first guidance element 230, the collision between the frame 110 and the first guidance element 230 may be prevented, the possibilities that the assembly does not follow an alignment correctly are reduced, and assembling accuracy is enhanced.

The second receiving portion 420 and the third receiving portion 430 include a second receiving portion recess 421 and a third receiving portion recess 431 for receiving the first adhesive element 510. When viewed from the first axis A1, the third receiving portion recess 431 and the bottom 120 at least partially overlap. Also, the second receiving portion 420 includes a second receiving portion overflow-proof structure 422 for receiving at least part of the first adhesive element 510. When viewed from the first axis A1, the second receiving portion overflow-proof structure 422 is close to the second receiving portion recess 421. The third receiving portion 430 includes a third receiving portion overflow-proof structure 432 receiving at least part of the first adhesive element 510. When viewed from the first axis A1, the third receiving portion overflow-proof structure 432 is close to the third receiving portion recess 431. When viewed from the first axis Al, the second receiving portion overflow-proof structure 422 and the third receiving portion overflow-proof structure 432 at least partially overlap. That is, when applying the first adhesive element 510 to affix the first guidance element 230, the second receiving portion recess 421 and the third receiving recess 431 may increase the contact area between the first adhesive element 510 and the bottom 130 and between the first adhesive element 510 and the frame 110. Also, the second receiving portion overflow-proof structure 422 and the third receiving portion overflow-proof structure 432 are able to receive part of the first adhesive element 510, and thus the overflow of the first adhesive element 510 is prevented.

Similarly, the fourth receiving portion 440, the fifth receiving portion 450, and the sixth receiving portion 460 receive the second guidance element 240, and each of them has a concave structure corresponding to the second guidance element 240. The fourth receiving portion 440 and the fifth receiving portion 450 are arranged along the second axis A2. The fourth receiving portion 440 and the sixth receiving portion 460 are arranged along the second axis A2. The fifth receiving portion 450 and the sixth receiving portion 460 are arranged along the first axis A1.

Figure 17:
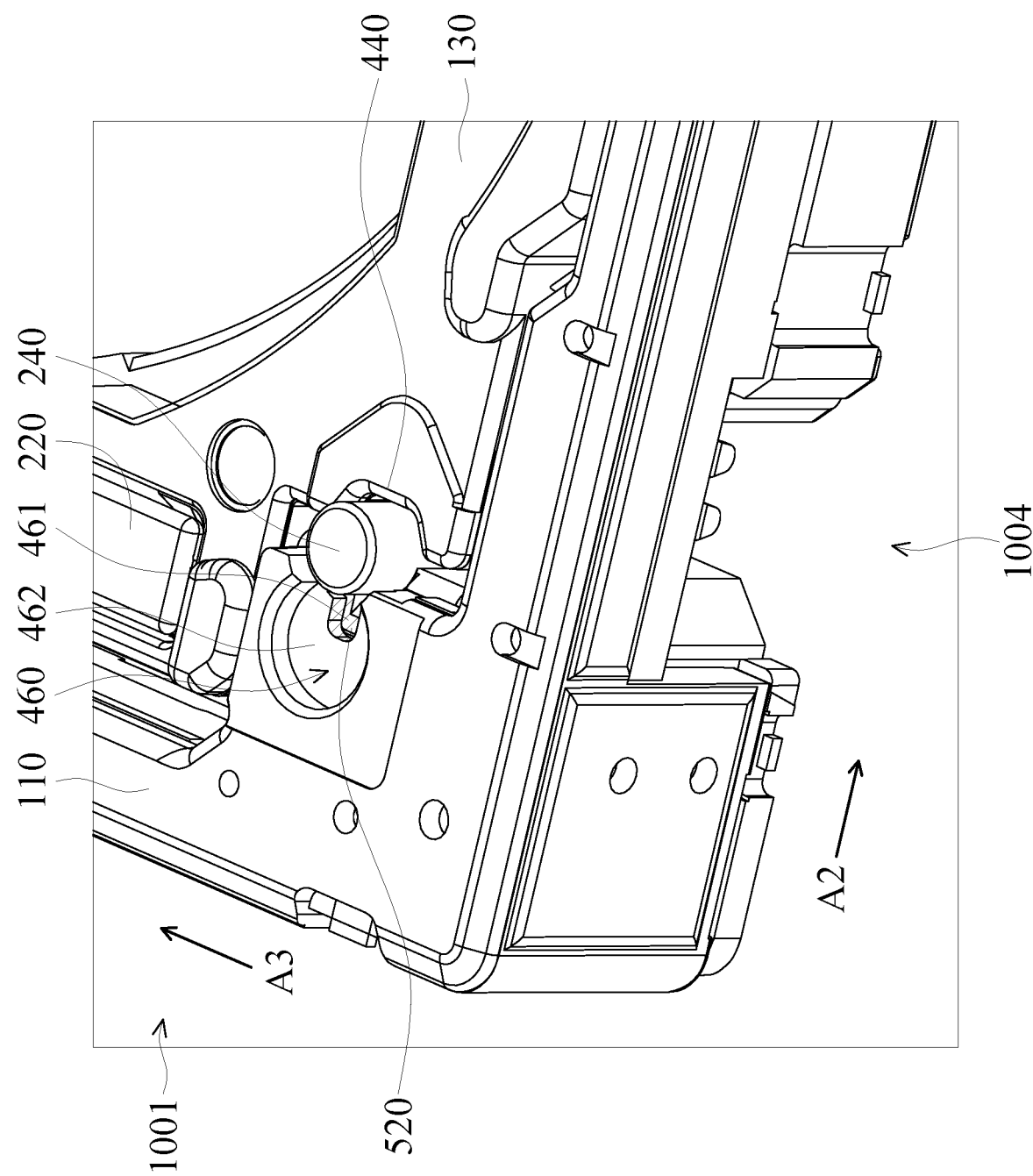
Figure 18:
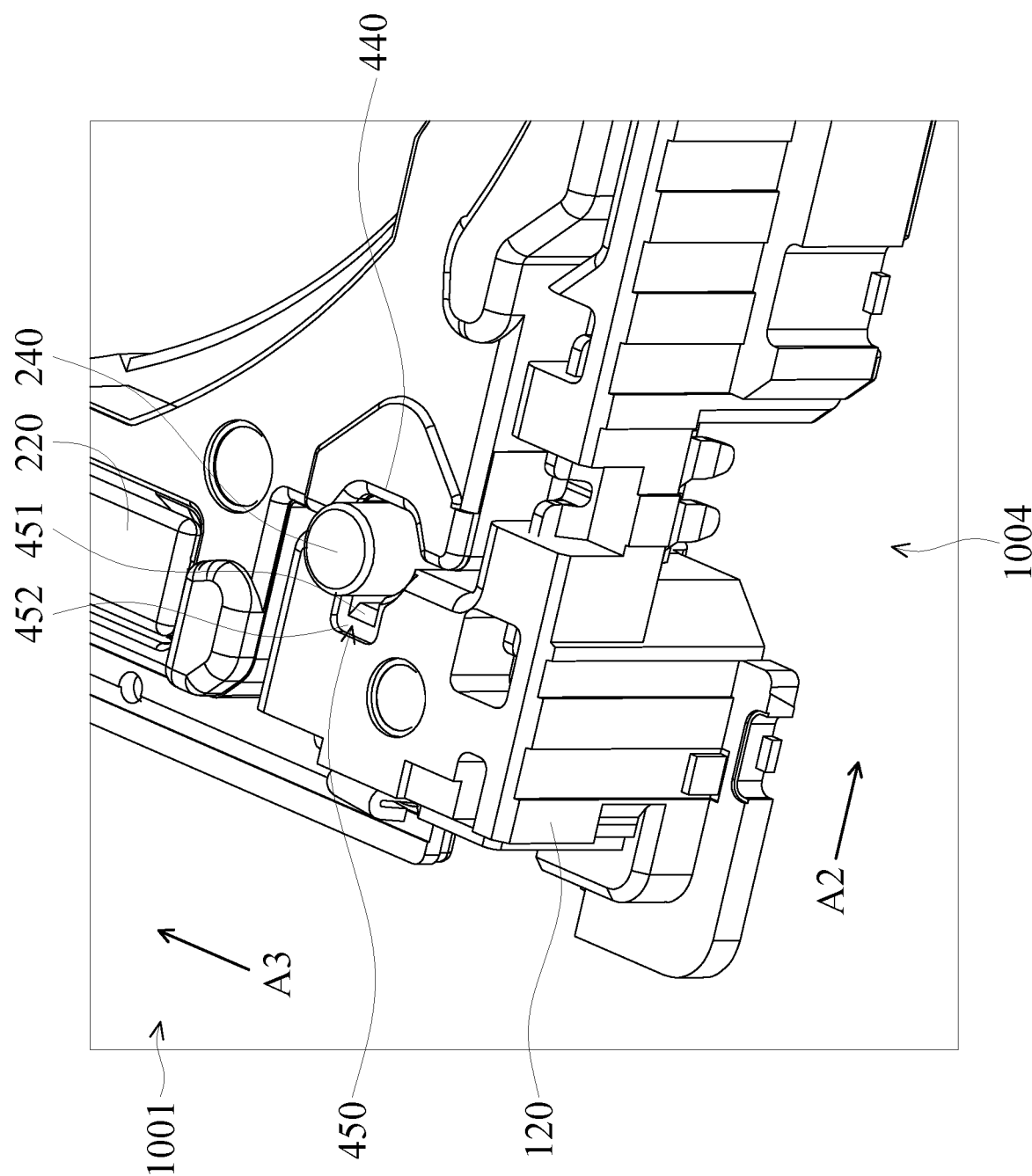

In some embodiments, the optical mechanism 100 further includes a second adhesive element 520 (only schematically illustrated in FIG. 17). The second guidance element 240 is immovably connected to the fifth receiving portion 450 via the second adhesive element 520, and the second adhesive element 520 is in direct contact with the frame 110 and the bottom 120. In some embodiments, the minimum distance between the fifth receiving portion 450 and the second guidance element 240 is less than the minimum distance between the sixth receiving portion 460 and the second guidance element 240. That is, the fifth receiving portion 450 on the bottom 120 is closer to the second guidance element 240 than the sixth receiving portion 460 on the frame 110. In this way, it is easier for the second adhesive element 520 to flow to the fifth receiving portion 450 on the bottom 120 from the sixth receiving portion 460 on the frame 110. Also, when applying the second adhesive element 520 to affix the second guidance element 240, the collision between the frame 110 and the second guidance element 240 may be prevented, the possibilities that the assembly does not follow an alignment correctly are reduced, and assembling accuracy is enhanced.

The fifth receiving portion 450 and the sixth receiving portion 460 include a fifth receiving portion recess 451 and a sixth receiving portion recess 461 for receiving the second adhesive element 520. When viewed from the first axis A1, the sixth receiving portion recess 461 and the bottom 120 at least partially overlap. Also, the fifth receiving portion 450 includes a fifth receiving portion overflow-proof structure 452 for receiving at least part of the second adhesive element 520. When viewed from the first axis A1, the fifth receiving portion overflow-proof structure 452 is close to the fifth receiving portion recess 451. The sixth receiving portion 460 includes a sixth receiving portion overflow-proof structure 462 receiving at least part of the second adhesive element 520. When viewed from the first axis A1, the sixth receiving portion overflow-proof structure 462 is close to the sixth receiving portion recess 461. When viewed from the first axis A1, the fifth receiving portion overflow-proof structure 452 and the sixth receiving portion overflow-proof structure 462 at least partially overlap. That is, when applying the second adhesive element 520 to affix the second guidance element 240, the fifth receiving portion recess 451 and the third receiving recess 431 may increase the contact area between the second adhesive element 520 and the bottom 130 and between the second adhesive element 520 and the frame 110. Also, the second receiving portion overflow-proof structure 422 and the third receiving portion overflow-proof structure 432 are able to receive part of the second adhesive element 520, and thus the overflow of the second adhesive element 520 is prevented.

It should be noted that, when viewed from the first axis A1, the first receiving portion 410 and the fourth receiving portion 440 have different structures. For example, when viewed from the first axis A1, the first receiving portion 410 is V-shaped while the fourth receiving portion 440 is U-shaped. In other words, the fourth receiving portion 440 includes a guidance surface 445 (only denoted in FIG. 12) facing the second guidance element 240. The guidance surface 445 is flat. The guidance surface 445 is in contact with the second guidance element 240. The guidance surface 445 is perpendicular to the second axis A2. Generally, the first guidance element 230 and the first receiving portion 410 that is V-shaped are closer than the second guidance element 240 and the fourth receiving portion 440 that is U-shaped.

Also, the minimum distance between the first magnetic element 210 and the magnetically-permeable element 200 in the second axis A2 is less than the minimum distance between the first guidance element 230 and the magnetically-permeable element 200 in the second axis A2. That is, the first magnetic element 210 is closer to the magnetically-permeable element 200 than the first guidance element 230. Similarly, the second magnetic element 220 is closer to the magnetically-permeable element 200 than the second guidance element 240 in the second axis A2. In this way, since the first magnetic element 210/the second magnetic element 220 is closer to the magnetically-permeable element 200 than the first guidance element 230/the second guidance element 240, the attraction force between the first magnetic element 210/the second magnetic element 220 and the magnetically-permeable element 200 may be increased, and the space is utilized effectively to achieve miniaturization.

Due to the attraction force between the first magnetic element 210 and the magnetically-permeable element 200, the attraction force between the second magnetic element 220 and the magnetically-permeable element 200, and tight contact between the first guidance element 230/the second guidance element 240 and the holder 130, the holder 130 may move in a certain dimension (e.g. the first axis A1), and unwanted shaking, rotating, or tilting of the holder 130 are prevented.

Figure 21:
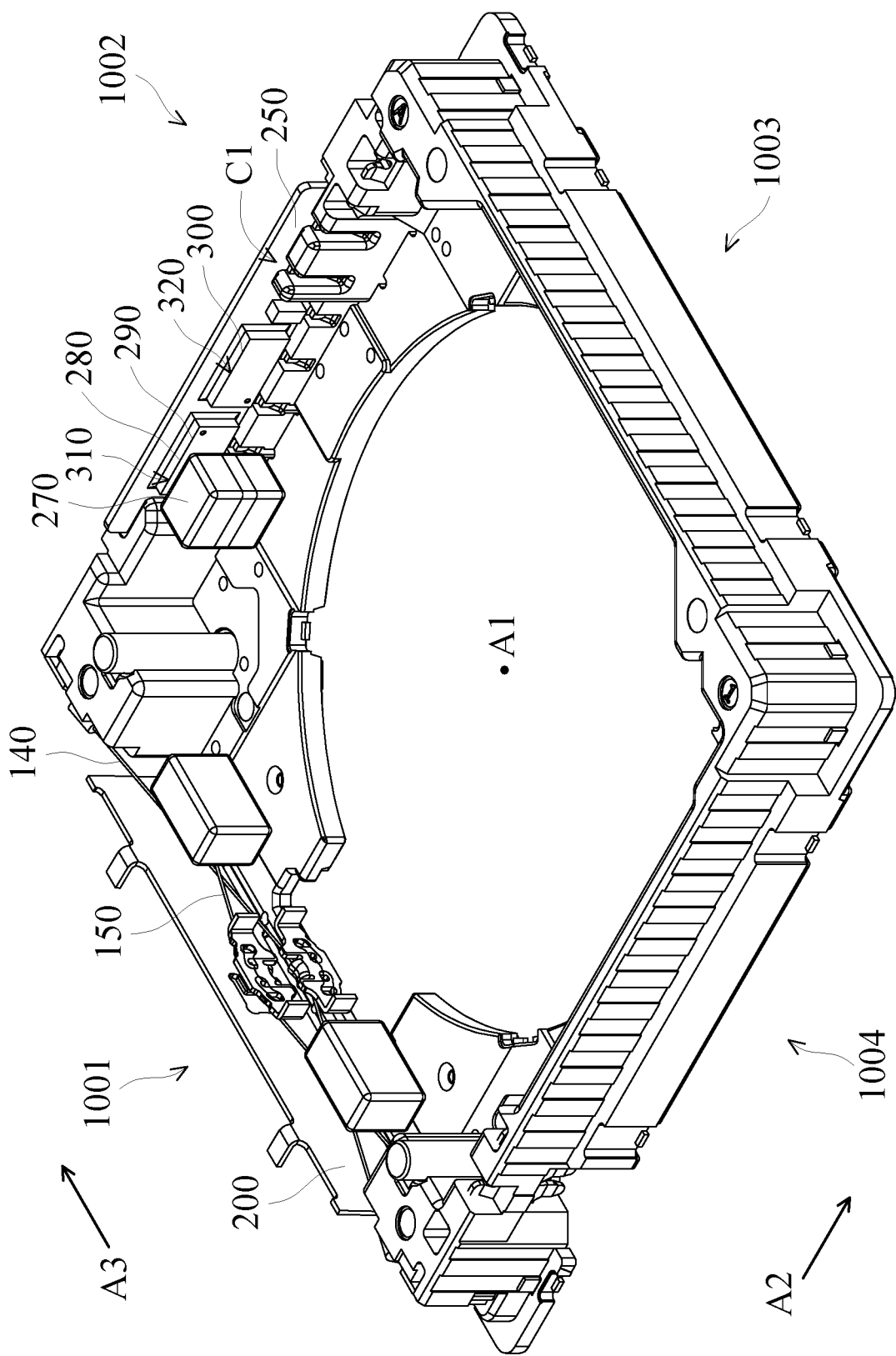
FIG. 21 and FIG. 22 are perspective views of the optical mechanism, in which the omitted elements are not exactly the same.
Figure 22:
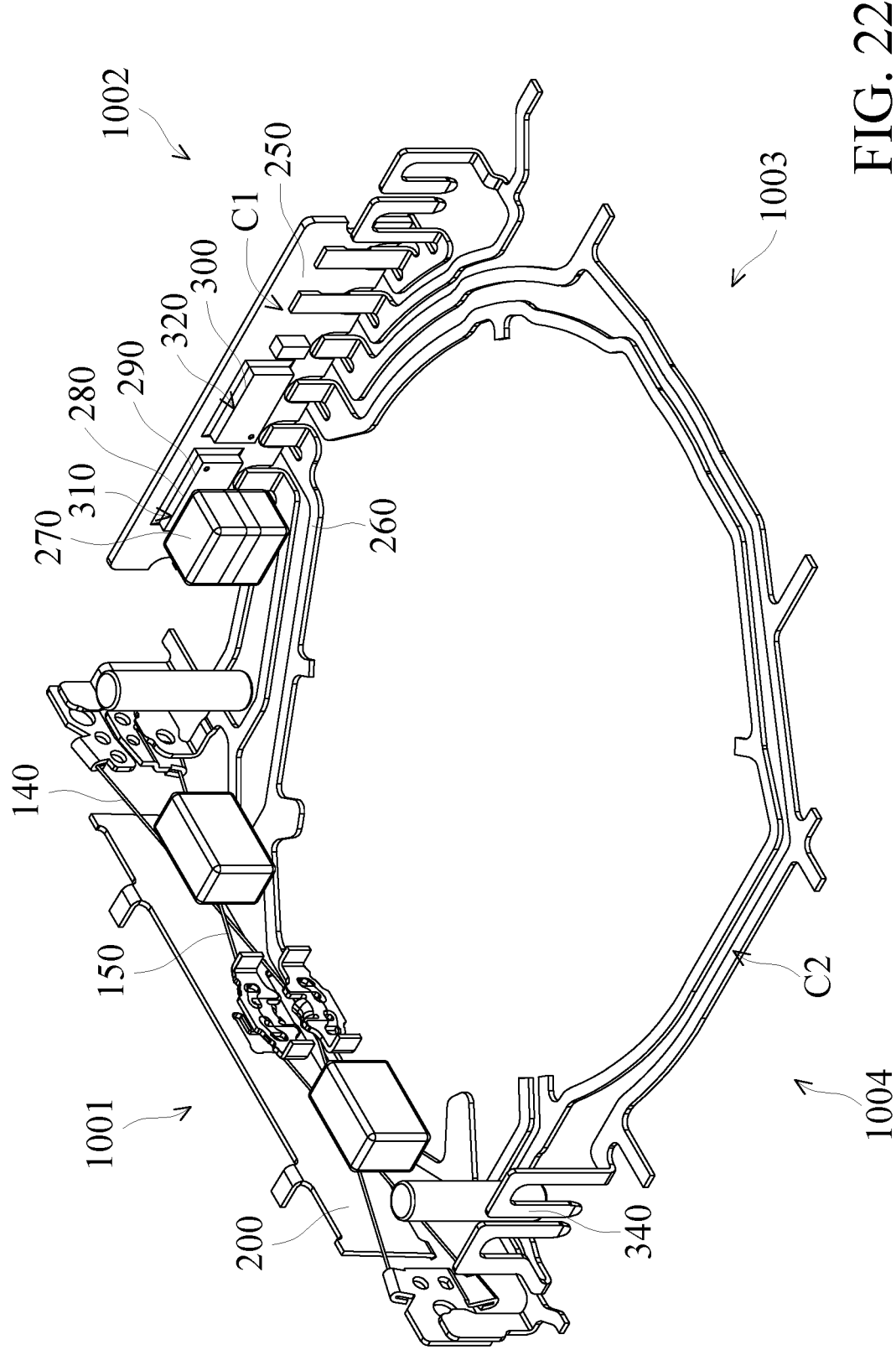

Next, in addition to FIG. 3 to FIG. 9, please also refer to FIG. 21 and FIG. 22 to know the first circuit assembly C1, the second circuit assembly C2, the sensing assembly S, and the control assembly C. FIG. 21 and FIG. 22 are perspective views of the optical mechanism 100, in which the omitted elements are not exactly the same. When viewed from the first axis A1, the sensing assembly S is located on the second side 1002. When viewed from the first axis A1, the first circuit assembly C1 is located on the second side 1002. When viewed from the first axis A1, the external connection terminal 340 is located on the second side 1002.

The first circuit assembly C1 includes a plate structure that is perpendicular to the first axis A1. The first circuits 250 of the first circuit assembly C1 are located on a first imaginary plane, and the first imaginary plane is parallel with the first axis A1. As described above, the second circuit assembly C2 may be immovably disposed in the bottom 120 by insert molding. The second circuits 260 of the second circuit assembly C2 are located on a second imaginary plane, and the second imaginary plane is not parallel with the first imaginary plane. In addition, in this embodiment, the external connection terminal 340 and at least part of the second circuit assembly C2 are integrally formed as a complete piece. The current may be supplied into the optical mechanism 100 via the external connection terminal 340. In particular, the external connection terminal 340 may be electrically connected to an external circuit outside the optical mechanism 100, and the external connection terminal 340 may include several pins.

The reference element 270 may be a magnetic element. The sensing element 280 may be a Hall sensor, a Giant Magneto Resistance (GMR) sensor, a Tunneling Magneto Resistance (TMR) sensor, etc. The reference element 270 may be disposed at the movable part M. For example, the reference element 270 may be disposed on the holder 130. The sensing element 280 may be disposed at the first circuit assembly C1 and electrically connected to the first circuit assembly C1. The sensing element 280 may detect the reference element 270 to find out the position of the movable part M. In particular, the sensing element 280 may detect the change of the lines of magnetic field (including but not limited to the density of the lines of magnetic field and the direction of the lines of magnetic field) of the reference element 270 to find out the position of the holder 130. Due to the sensing assembly S, the position of the movable part M may be known in a short period of time.

As illustrated, the minimum distance between the sensing assembly S and the first guidance element 230 is less than the minimum distance between the sensing assembly S and the second guidance element 240. That is, the sensing assembly S is closer to the first guidance element 230 than the second guidance element 240. As described above, since the first guidance element 230 and the first receiving portion 410 may be closer than the second guidance element 240 and the fourth receiving portion 440, placing the sensing assembly S closer to the first guidance element 230 may enhance the sensing accuracy.

The drive assembly D may be controlled by the first control unit 290 and the second control unit 300. The first drive element 140 and the second drive element 150 may be controlled separately. The first control unit 290 that is packaged in the first package 310 outputs a first drive signal to the first drive element 140. The second control unit 300 that is packaged in the second package 320 outputs a second drive signal to the second drive element 150. According to the position of the movable part M sensed by the sensing assembly S, the first control unit 290 and the second control unit 300 may control the drive signals to the first drive element 140 and the second drive element 150, respectively, to achieve closed-loop feedback. The first package 310 and the second package 320 are independent, and a gap is formed between the first package 310 and the second package 320. That is, the first package 310 is not in contact with the second package 320.

The first package 310 is electrically connected to the external circuit via the first circuit assembly C1 and the second circuit assembly C2 sequentially. The second package 320 is electrically connected to the external circuit via the first circuit assembly C1 and the second circuit assembly C2 sequentially. The drive assembly D is electrically connected to the first package 310 and the second package 320 via the first circuit assembly C1 and the second circuit assembly C2 sequentially. Since the first drive element 140 and the second drive element 150 may be independently controlled, design flexibility is enhanced, and high stability and high accuracy may be achieved. However, in some other embodiments, there may be only one control unit controlling both the first drive element 140 and the second drive element 150.

Figure 23:
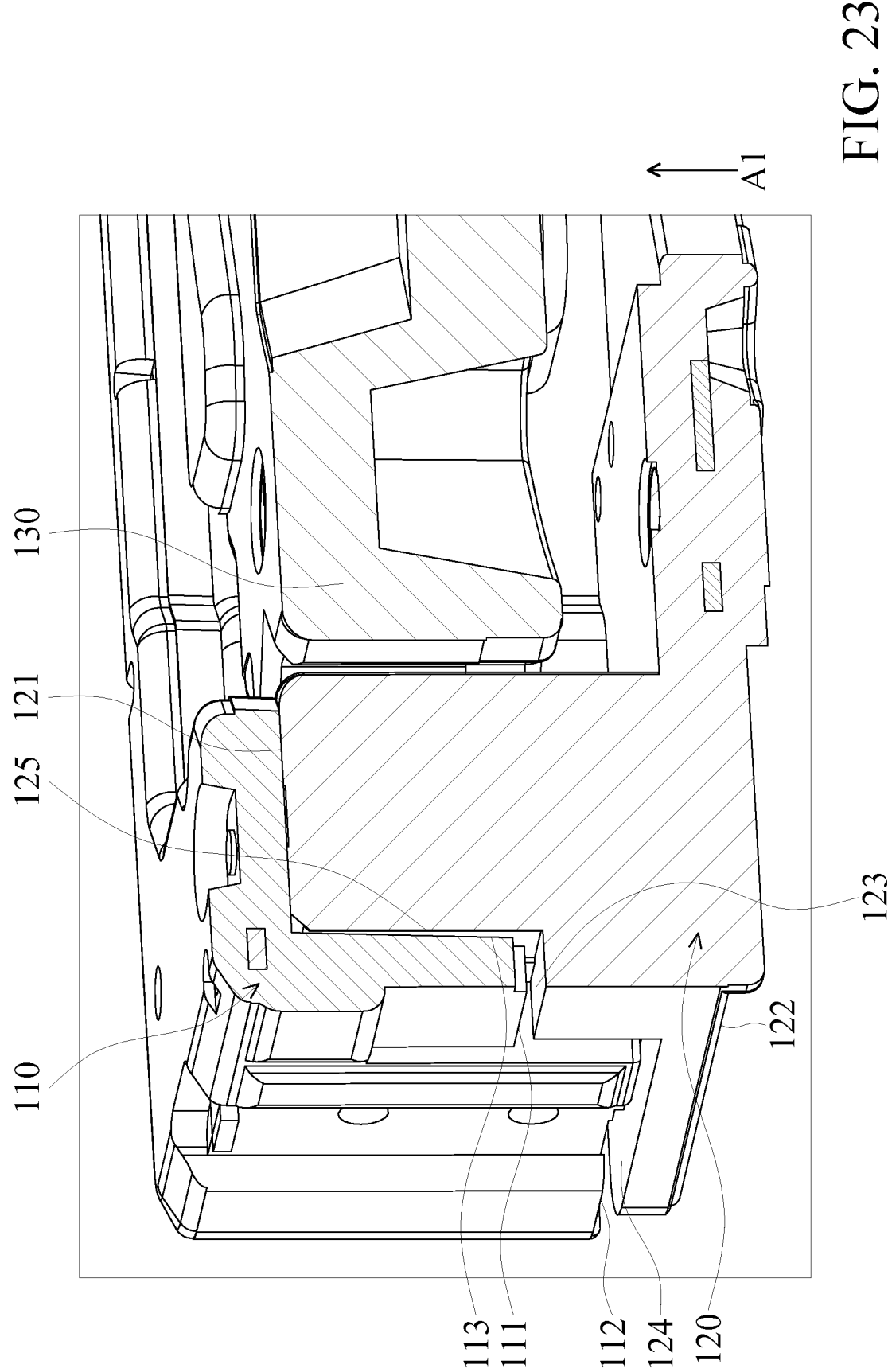
FIG. 23 is an enlarged view of part of the optical mechanism.
Figure 24:
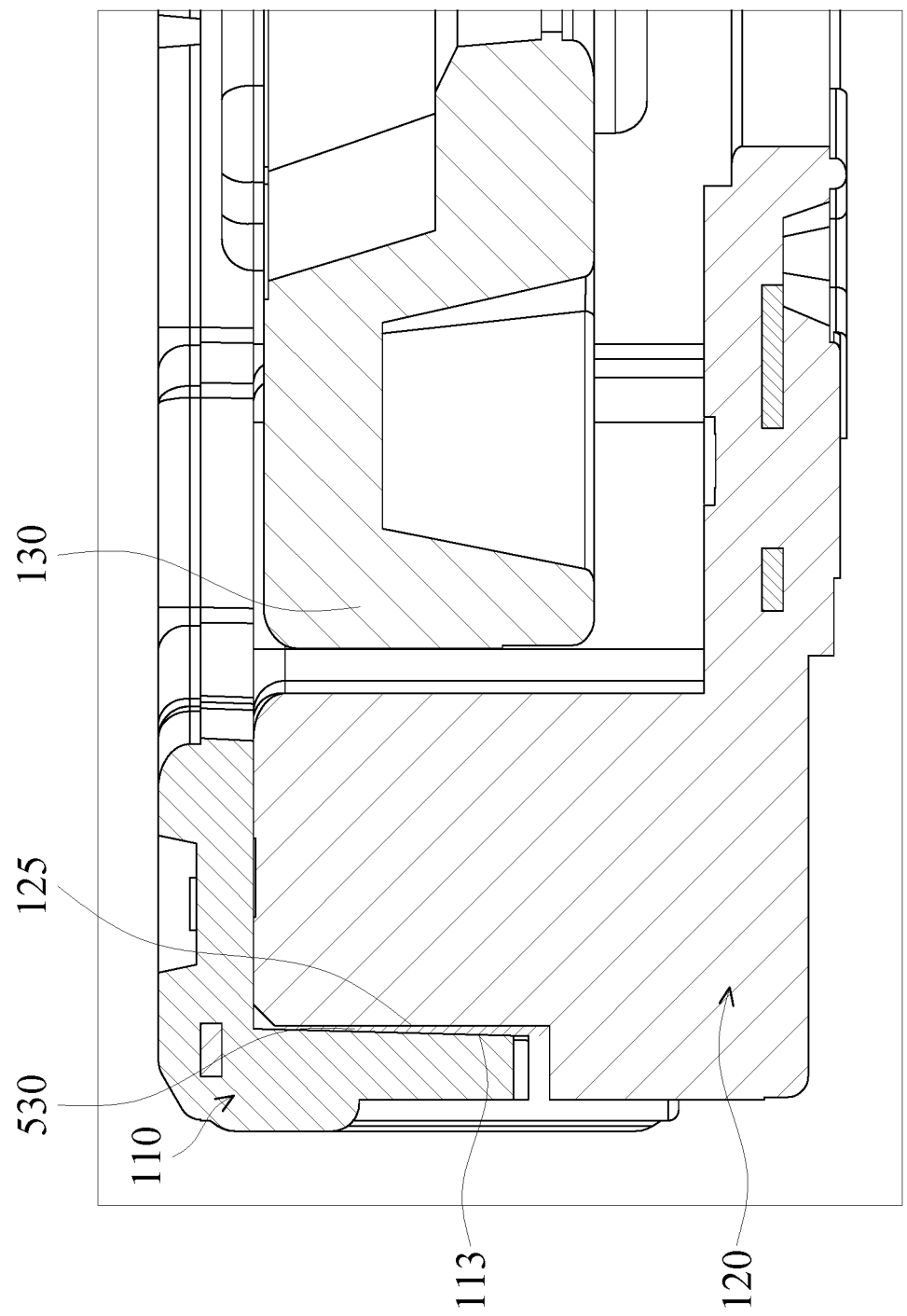
FIG. 24 is a cross-sectional view of the optical mechanism taken along the line C-C of FIG. 6.

Next, please refer to FIG. 4, FIG. 5, FIG. 23, and FIG. 24 to know some other features of the optical mechanism 100. FIG. 23 is an enlarged view of part of the optical mechanism 100. FIG. 24 is a cross-sectional view of the optical mechanism 100 taken along the line C-C of FIG. 6.

The frame 110 includes a first frame surface 111, a second frame surface 112, and a third frame surface 113. The bottom 120 includes a first bottom surface 121, a second bottom surface 122, a third bottom surface 123, a fourth bottom surface 124, a fifth bottom surface 125, a first opening 126, a second opening 127, and a third opening 128. The first frame surface 111, the second frame surface 112, the first bottom surface 121, the second bottom surface 122, the third bottom surface 123, and the fourth bottom surface 124 are all perpendicular to the first axis A1.

The first frame surface 111, the second frame surface 112, and the third frame surface 113 face the bottom 120. The first bottom surface 121 and the third bottom surface 123 face the frame 110. The second bottom surface 122 and the first bottom surface 121 face in opposite directions. For ease of illustration, a first direction D1 is defined, and the first direction D1 and the second bottom surface 122 face in opposite directions. For example, in FIG. 5, the first direction D1 is the direction that points inwards to the paper.

When viewed from the first axis A1, the minimum distance between the first frame surface 111 and the movable part M is less than the minimum distance between the second frame surface 112 and the movable part M. That is, the first frame surface 111 is closer to the holder 130 than the second frame surface 112. In the first axis A1, the third bottom surface 123 is located between the first bottom surface 121 and the fourth bottom surface 124. In the first axis A1, the minimum distance between the first bottom surface 121 and the third bottom surface 123 is less than the minimum distance between the first bottom surface 121 and the fourth bottom surface 124. That is, in the first axis A1, the fourth bottom surface 124 is closer to the third bottom surface 123 than the first bottom surface 121.

The first frame surface 111 faces the third bottom surface 123, and the first frame surface 111 is parallel with the third bottom surface 123. The second frame surface 112 faces the fourth bottom surface 124, and the second frame surface 112 is parallel with the fourth bottom surface 124. The minimum distance between the first frame surface 111 and the third bottom surface 123 is less than the minimum distance between the second frame surface 112 and the fourth bottom surface 124. That is, the first frame surface 111 and the third bottom surface 123 are closer than the second frame surface 112 and the fourth bottom surface 124. Also, as shown in FIG. 23, the region on which the fourth bottom surface 124 is located are thinner than the region on which the third bottom surface 123 is located. Support via the third bottom surface 123 may be more stable. In some embodiments, there may be corresponding structures used for positioning formed between the first frame surface 111 and the third bottom surface 123.

In some embodiments, in a direction that is perpendicular to the first bottom surface 121, the second bottom surface 122 and the drive assembly D at least partially overlap. As shown in FIG. 5, when viewed from the first direction, the second opening 127 is between the first opening 126 and the third opening 128. When viewed from the first direction D1, at least part of the drive assembly D is revealed from the first opening 126, the second opening 127, and the third opening 128. For example, when viewed from the first direction D1, at least part of the first drive element fixing element 160 near the second side 1002, at least part of the first clamping portion 161, and at least part of the second drive element fixing element 170 near the second side 1002 are revealed from the first opening 126. For example, when viewed from the first direction D1, at least part of the first drive element 140 and at least part of the second drive element 150 are revealed from the second opening 127. For example, when viewed from the first direction D1, at least part of the first drive element fixing element 160 near the fourth side 1004, at least part of the second clamping portion 162, and at least part of the second drive element fixing element 170 near the fourth side 1004 are revealed from the third opening 128.

In some embodiments, the optical mechanism 100 further includes a third adhesive element 530 (only schematically illustrated in FIG. 24). The third adhesive element 530 is disposed between the third frame surface 113 and the fifth bottom surface 125, so that the frame 110 is connected to the bottom 120 via the third adhesive element 530. The third frame surface 113 faces the fifth bottom surface 125, and the third frame surface 113 is not parallel with the fifth bottom surface 125. The third frame surface 113 or the fifth bottom surface 125 is parallel with the first axis A1. That is, one of the third frame surface 113 and the fifth bottom surface 125 is parallel with the first axis A1, and the other of the third frame surface 113 and the fifth bottom surface 125 is inclined relative to the first axis A1. Therefore, a space that is able to receive the third adhesive element 530 may be formed between the third frame surface 113 and the fifth bottom surface 125 to strengthen the connection between the frame 110 and the bottom 120.

It should be noted that, the first adhesive element 510, the second adhesive element 520, and the third adhesive element 530 may include same or different materials. The first adhesive element 510, the second adhesive element 520, and the third adhesive element 530 may be an adhesive material, a conductive material, or an insulation material, such as resin or optical adhesives. Different elements may be adhered to each other by the first adhesive element 510, the second adhesive element 520, and the third adhesive element 530. Furthermore, the first adhesive element 510, the second adhesive element 520, and the third adhesive element 530 generally have good elasticity and good covering ability and thus the first adhesive element 510, the second adhesive element 520, and the third adhesive element 530 may protect the elements. Additionally, the first adhesive element 510, the second adhesive element 520, and the third adhesive element 530 may reduce the possibilities that particles such as dust or mist enter the elements. If the first adhesive element 510, the second adhesive element 520, and the third adhesive element 530 are made of an insulation material, insulation may be achieved. The connection between the elements may be strengthened by the first adhesive element 510, the second adhesive element 520, and the third adhesive element 530. Therefore, the structural strength of the overall optical mechanism 100 is increased.

As described above, the first drive element and the second drive element may be controlled separately, so that design flexibility is enhanced, and high stability and high accuracy may be achieved. Due to the attraction force between the first magnetic element and the magnetically-permeable element and the attraction force between the second magnetic element and the magnetically-permeable element, the first guidance element and the second guidance element may be in tight contact with movable part. Due to the first guidance element and the second guidance element, the movable part may move in a certain dimension, and unwanted shaking, rotating, or tilting of the movable part are prevented. Also, due to the sensing assembly, the position of the movable part is known instantly. According to the position of the movable part sensed by the sensing assembly, the first control unit and the second control unit may control the drive signals to the first drive element and the second drive element, respectively, to achieve closed-loop feedback. Furthermore, to strengthen the connection between the elements and to strengthen the mechanical strength of the overall optical mechanism, there may be corresponding configuration between the elements such as corresponding shapes or corresponding structures, and the adhesive element may be applied to the elements.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical mechanism, comprising:
   an immovable part;
   a movable part connected to an optical element, wherein the movable part is movable relative to the immovable part;
   a drive assembly driving the movable part to move relative to the immovable part;
   a guidance assembly guiding the movable part to move along a first axis and comprising a first guidance element extending in the first axis and a second guidance element extending in the first axis; and
   a sensing assembly sensing movement of the movable part relative to the immovable part and comprising a reference element and a sensing element corresponding to the reference element,
   wherein a minimum distance between the sensing assembly and the first guidance element is less than a minimum distance between the sensing assembly and the second guidance element.

2. The optical mechanism as claimed in claim 1, wherein when viewed from the first axis, the optical mechanism is polygonal, and the optical mechanism comprises:
   a first side, wherein when viewed from the first axis, the first side is parallel with a third axis and extends in the third axis;
   a second side, wherein when viewed from the first axis, the second side is parallel with a second axis and extends in the second axis, and the first axis, the second axis, and the third axis are perpendicular to each other;
   a third side opposite to the first side; and
   a fourth side opposite to the second side,
   wherein when viewed from the first axis, the drive assembly is located on the first side, the guidance assembly is located on the first side, and the sensing assembly is located on the second side.

3. The optical mechanism as claimed in claim 1, wherein the drive assembly comprises a first drive element and a second drive element, the first drive element and the second drive element comprises a shape memory alloy material, wherein the optical mechanism further comprises a control assembly controlling the drive assembly, and the control assembly comprises:
a first control unit outputting a first drive signal to the first drive element of the drive assembly, wherein the first control unit and the sensing element are packaged in a first package.

4. The optical mechanism as claimed in claim 3, wherein the control assembly further comprises a second control unit outputting a second drive signal to the second drive element of the drive assembly, wherein the second control unit is packaged in a second package, wherein the first package and the second package are independent, and a gap is formed between the first package and the second package.

5. The optical mechanism as claimed in claim 4, wherein the optical mechanism further comprises:
a first circuit assembly comprising a plurality of first circuits, wherein the first circuits are located on a first imaginary plane that is parallel with the first axis; and
a second circuit assembly comprising a plurality of second circuits, wherein the second circuits are located on a second imaginary plane that is not parallel with the first imaginary plane.

6. The optical mechanism as claimed in claim 5, wherein the first package and the second package are disposed on the first circuit assembly.

7. The optical mechanism as claimed in claim 5, wherein the immovable part comprises a frame and a bottom immovably connected to the frame, the second circuit assembly is immovably disposed on the bottom, and at least part of the second circuits are embedded and not revealed from the bottom.

8. The optical mechanism as claimed in claim 5, further comprising an external connection terminal electrically connected to an external circuit, wherein the external connection terminal and at least part of the second circuits are integrally formed as a complete piece.

9. The optical mechanism as claimed in claim 8, wherein when viewed from the first axis, the optical mechanism is polygonal, and the optical mechanism comprises:
a first side, wherein when viewed from the first axis, the first side is parallel with a third axis and extends in the third axis;
a second side, wherein when viewed from the first axis, the second side is parallel with a second axis and extends in the second axis, and the first axis, the second axis, and the third axis are perpendicular to each other;
a third side opposite to the first side; and
a fourth side opposite to the second side,
wherein the first circuit assembly is located on the second side, and the external connection terminal is located on the fourth side.

10. The optical mechanism as claimed in claim 8, wherein the first package is electrically connected to the external circuit via the first circuit assembly and the second circuit assembly sequentially, and the drive assembly is electrically connected to the first package via the second circuit assembly and the first circuit assembly sequentially.

11. The optical mechanism as claimed in claim 1, wherein the immovable part comprises a frame and a bottom immovably connected to the frame, wherein the optical mechanism further comprises a strengthening element strengthening mechanical strength of the frame, wherein the strengthening element comprises a metal material, and at least part of the strengthening element is embedded in the frame and not revealed from the frame.

12. The optical mechanism as claimed in claim 1, wherein the immovable part comprises a frame and a bottom immovably connected to the frame, and the optical mechanism further comprises a third adhesive element, wherein the frame comprises a third frame surface, the bottom comprises a fifth bottom surface, and the third adhesive element is disposed between the third frame surface and the fifth bottom surface, so that the frame is immovably connected to the bottom via the third adhesive element.

13. The optical mechanism as claimed in claim 12, wherein the third frame surface faces the fifth bottom surface, the third frame surface is not parallel with the fifth bottom surface, and one of the third frame surface and the fifth bottom surface is parallel with the first axis.

14. An optical system, comprising:
an optical mechanism as claimed in claim 1, wherein when viewed from a direction of incident light, the movable part is completely revealed from the immovable part, wherein the optical system comprises:
a case having a top wall and a side wall, wherein the top wall is not parallel with the side wall, and the top wall restricts movement range of the movable part;
a base, wherein an accommodating space accommodating the optical mechanism is formed by the case and the base; and
a drive module driving the optical mechanism to move relative to the case.

15. An optical mechanism, comprising:
an immovable part comprising a frame and a bottom immovably connected to the frame;
a movable part connected to an optical element, wherein the movable part is movable relative to the immovable part;
a drive assembly driving the movable part to move relative to the immovable part;
a guidance assembly guiding the movable part to move along a first axis and comprising a magnetically-permeable element; and
a strengthening element strengthening mechanical strength of the frame,
wherein the strengthening element comprises a metal material, and at least part of the strengthening element is embedded in the frame and not revealed from the frame;
wherein the magnetically-permeable element comprises a magnetically-permeable material, and a gap is formed between the strengthening element and the magnetically-permeable element.

16. An optical mechanism, comprising:
an immovable part comprising a frame and a bottom immovably connected to the frame;
a movable part connected to an optical element, wherein the movable part is movable relative to the immovable part;
a drive assembly driving the movable part to move relative to the immovable part; and
a guidance assembly guiding the movable part to move along a first axis,
wherein the frame comprises a first frame surface and a second frame surface, and the bottom comprises a first bottom surface, a third bottom surface, and a fourth bottom surface;
wherein the first frame surface, the second frame surface, the first bottom surface, the third bottom surface, and the fourth bottom surface are perpendicular to the first axis;

wherein the first frame surface faces the third bottom surface, and the first frame surface is parallel with the third bottom surface;

wherein the second frame surface faces the fourth bottom surface, and the second frame surface is parallel with the fourth bottom surface;

wherein the first bottom surface faces the frame;

wherein when viewed from the first axis, a minimum distance between the first frame surface and the movable part is less than a minimum distance between the second frame surface and the movable part;

wherein a minimum distance between the first bottom surface and the third bottom surface in the first axis is greater than a minimum distance between the third bottom surface and the fourth bottom surface in the first axis.

17. The optical mechanism as claimed in claim 16, wherein a minimum distance between the first frame surface and the third bottom surface is less than a minimum distance between the second frame surface and the fourth bottom surface.

18. An optical system, comprising:
an optical mechanism, comprising:
   an immovable part;
   a movable part connected to an optical element, wherein the movable part is movable relative to the immovable part, and when viewed from a direction of incident light, the movable part is completely revealed from the immovable part;
   a drive assembly driving the movable part to move relative to the immovable part; and
   a guidance assembly guiding the movable part to move along a first axis;
a case having a top wall and a side wall, wherein the top wall is not parallel with the side wall, and the top wall restricts movement range of the movable part;
a base, wherein an accommodating space accommodating the optical mechanism is formed by the case and the base; and
a drive module driving the optical mechanism to move relative to the case,
wherein the guidance assembly comprises a first guidance element extending in the first axis and a second guidance element extending in the first axis, wherein the optical mechanism further comprises a sensing assembly sensing movement of the movable part relative to the immovable part, and a minimum distance between the sensing assembly and the first guidance element is less than a minimum distance between the sensing assembly and the second guidance element.

19. An optical system, comprising:
an optical mechanism, comprising:
   an immovable part;
   a movable part connected to an optical element, wherein the movable part is movable relative to the immovable part, and when viewed from a direction of incident light, the movable part is completely revealed from the immovable part;
   a drive assembly driving the movable part to move relative to the immovable part; and
   a guidance assembly guiding the movable part to move along a first axis;
a case having a top wall and a side wall, wherein the top wall is not parallel with the side wall, and the top wall restricts movement range of the movable part;
a base, wherein an accommodating space accommodating the optical mechanism is formed by the case and the base; and
a drive module driving the optical mechanism to move relative to the case;
wherein the drive assembly comprises a first drive element and a second drive element, and the first drive element and the second drive element comprises a shape memory alloy material, wherein the optical mechanism further comprises a control assembly controlling the drive assembly, and the control assembly comprises:
   a first control unit outputting a first drive signal to the first drive element of the drive assembly, wherein the first control unit is packaged in a first package; and
   a second control unit outputting a second drive signal to the second drive element of the drive assembly, wherein the second control unit is packaged in a second package,
wherein the first package and the second package are independent, and a gap is formed between the first package and the second package.

* * * * *